US012568252B2

(12) United States Patent
Zhen et al.

(10) Patent No.: US 12,568,252 B2
(45) Date of Patent: Mar. 3, 2026

(54) DISPLAY METHOD AND APPARATUS FOR EVENT LIVESTREAMING, DEVICE AND STORAGE MEDIUM

(71) Applicant: TENCENT TECHNOLOGY (SHENZHEN) COMPANY LIMITED, Shenzhen (CN)

(72) Inventors: Zhiliang Zhen, Shenzhen (CN); Binbin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 73 days.

(21) Appl. No.: 18/340,884

(22) Filed: Jun. 25, 2023

(65) Prior Publication Data

US 2023/0336792 A1 Oct. 19, 2023

Related U.S. Application Data

(63) Continuation of application No. PCT/CN2022/128699, filed on Oct. 31, 2022.

(30) Foreign Application Priority Data

Nov. 24, 2021 (CN) .......................... 202111402724.5
Dec. 29, 2021 (CN) .......................... 202111643183.5

(51) Int. Cl.
*H04N 21/2187* (2011.01)
*H04N 21/472* (2011.01)

(52) U.S. Cl.
CPC ... *H04N 21/2187* (2013.01); *H04N 21/47217* (2013.01)

(58) Field of Classification Search
CPC ..................... H04N 21/2187; H04N 21/47217
See application file for complete search history.

(56) References Cited

U.S. PATENT DOCUMENTS

2015/0224395 A1* 8/2015 Trombetta ................ G06F 3/14
463/24
2017/0072321 A1* 3/2017 Thompson ......... H04N 21/2358
(Continued)

FOREIGN PATENT DOCUMENTS

CN 110493639 A 11/2019
CN 111836110 A 10/2020
(Continued)

OTHER PUBLICATIONS

China National Intellectual Property Administration (CNIPA) Office Action 1 for 202111643183.5 Aug. 3, 2022 13 Pages (including translation).

(Continued)

*Primary Examiner* — Randy A Flynn
(74) *Attorney, Agent, or Firm* — Anova Law Group, PLLC

(57) ABSTRACT

A display method includes: displaying a livestreaming image of an event live stream in a livestreaming interface, the event live stream being a stream of an event in which one or more virtual characters play in a virtual environment; displaying a playback control corresponding to a target segment in the livestreaming interface, the target segment being a historical segment in the event live stream; and displaying, in response to a split screen display operation triggered based on the playback control, the livestreaming image in a first split screen area and displaying a playback image of the target segment in a second split screen area, the first split screen area and the second split screen area being different display areas in the livestreaming interface, and the first split screen area and the second split screen area having no intersection.

16 Claims, 14 Drawing Sheets

(56)                References Cited

U.S. PATENT DOCUMENTS

| | | | | |
|---|---|---|---|---|
| 2017/0105040 | A1* | 4/2017 | Gao | .................. H04N 21/4722 |
| 2017/0246544 | A1* | 8/2017 | Agarwal | ................. A63F 13/63 |
| 2018/0020243 | A1* | 1/2018 | Ni | ................... H04N 21/23418 |
| 2018/0356934 | A1* | 12/2018 | Imanishi | ........... H04N 21/4312 |
| 2018/0369693 | A1 | 12/2018 | Rong | |
| 2021/0160553 | A1* | 5/2021 | Yu | ..................... H04N 21/4882 |
| 2021/0329352 | A1* | 10/2021 | Thomas | .......... H04N 21/23424 |

FOREIGN PATENT DOCUMENTS

| | | | |
|---|---|---|---|
| CN | 112995687 | A | 6/2021 |
| CN | 113286181 | A | 8/2021 |
| CN | 113301421 | A | 8/2021 |
| CN | 113490010 | A | 10/2021 |
| CN | 113497946 | A | 10/2021 |
| CN | 114339368 | A | 4/2022 |
| JP | 2018520772 | A | 8/2018 |
| JP | 2019144826 | A | 8/2019 |

OTHER PUBLICATIONS

The World Intellectual Property Organization (WIPO) International Search Report for PCT/CN2022/128699 Jan. 19, 2023 13 Pages (including translation).

What about mobile games."https:/ /baijiahao.baidu.com/s?id= 1681S8442S164948683""What kind of black technology did Huya use to make the live broadcast of League of Legends 510 match faster by one second?", Oct. 26, 2020 (Oct. 26, 2020).

The Japan Patent Office (JPO) Notice of Reasons for Refusal for Application No. 2024-502658 Feb. 12, 2025 12 Pages (including translation).

* cited by examiner

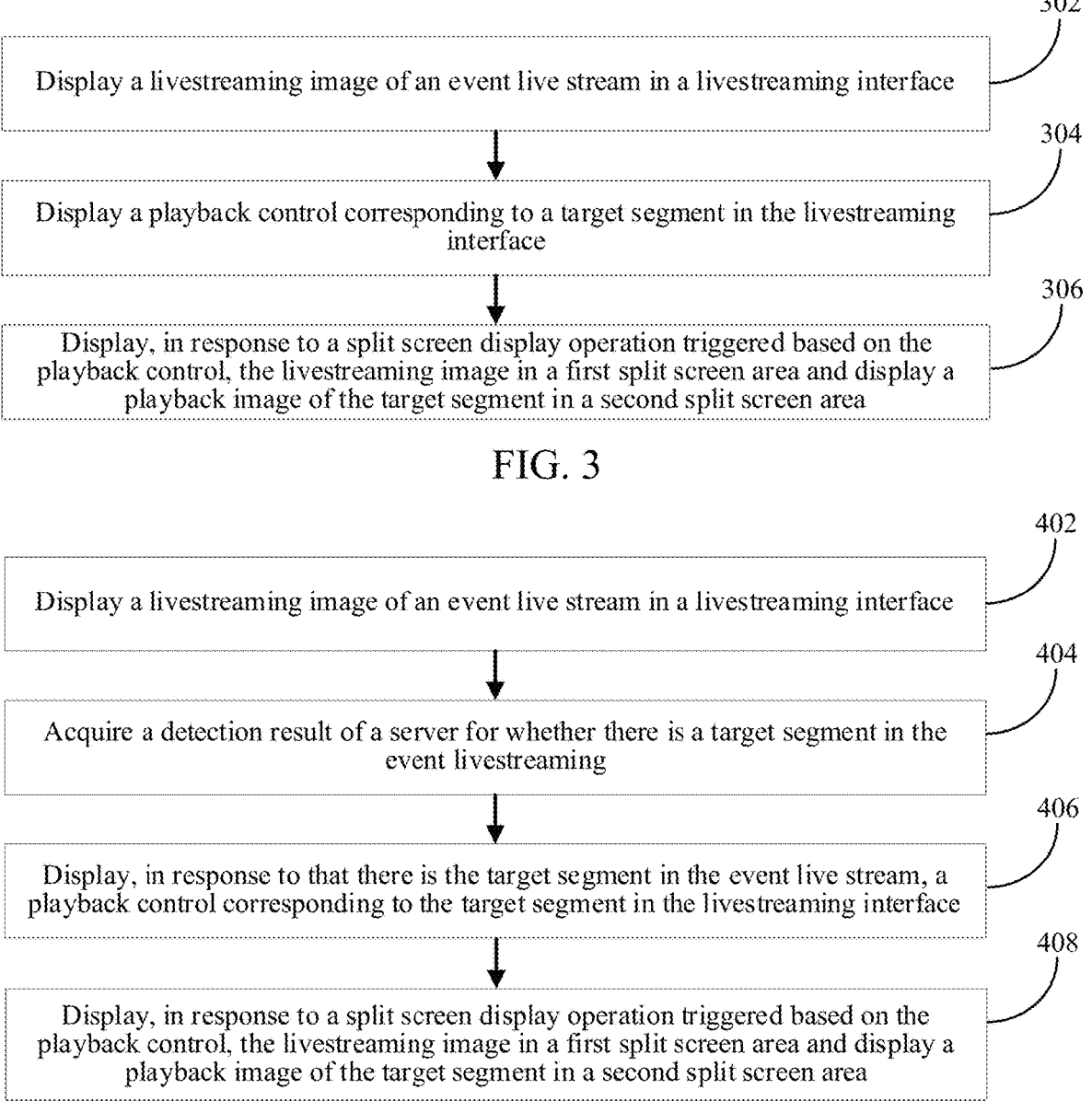

302

Display a livestreaming image of an event live stream in a livestreaming interface

304

Display a playback control corresponding to a target segment in the livestreaming interface

306

Display, in response to a split screen display operation triggered based on the playback control, the livestreaming image in a first split screen area and display a playback image of the target segment in a second split screen area

Display a livestreaming image of an event live stream in a livestreaming interface

404

Acquire a detection result of a server for whether there is a target segment in the event livestreaming

406

Display, in response to that there is the target segment in the event live stream, a playback control corresponding to the target segment in the livestreaming interface

408

Display, in response to a split screen display operation triggered based on the playback control, the livestreaming image in a first split screen area and display a playback image of the target segment in a second split screen area

FIG. 4

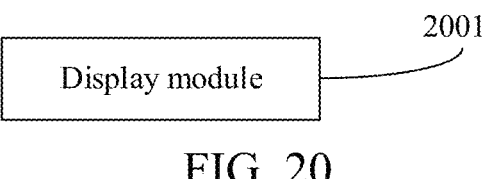
FIG. 20
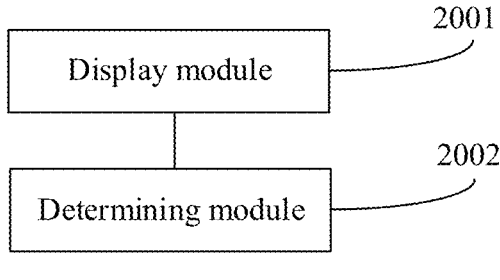
FIG. 21
2200
2201
Processor
2202
Memory
2203
Display screen
FIG. 22

DISPLAY METHOD AND APPARATUS FOR EVENT LIVESTREAMING, DEVICE AND STORAGE MEDIUM

CROSS-REFERENCES TO RELATED APPLICATIONS

This application is a continuation application of PCT Patent Application No. PCT/CN2022/128699, filed on Oct. 31, 2022, which claims priority to Chinese Patent Application No. 202111402724.5, entitled "DISPLAY METHOD AND APPARATUS FOR EVENT LIVESTREAMING, DEVICE AND STORAGE MEDIUM" filed on Nov. 24, 2021, and Chinese Patent Application No. 202111643183.5, entitled "DISPLAY METHOD AND APPARATUS FOR EVENT LIVESTREAMING, DEVICE AND STORAGE MEDIUM" filed on Dec. 29, 2021, the entire contents of all of which are incorporated herein by reference.

FIELD OF THE TECHNOLOGY

The present disclosure relates to the technical field of livestreaming, in particular to a display method and apparatus for event livestreaming, a device and a storage medium.

BACKGROUND

During an esports event, a server can broadcast live matches of the esports event to users. A client that supports a livestreaming function of the esports event can acquire an event live stream of the ongoing match of the esports event from the server and display a livestreaming image of the event live stream in a livestreaming interface.

In a process of broadcasting live the matches of the esports event, there may be some highlight segments, for example, a segment that a virtual character controlled by a player in a first team participating in the match defeats virtual characters controlled by all players in a second team participating in the match. For the highlight segment, the users may desire to review them. In the related art, a progress bar may be displayed in the livestreaming interface, and the progress bar is used for reflecting a current playing progress of the event live stream. According to a playback operation triggered by dragging the progress bar, the client can play back the event live stream from the playback progress selected by the playback operation, so as to play back the target segment in the event live stream.

When playing back the highlight segment through the above mode, if the users need to continue watching the event livestreaming, they need to exit the current highlight segment played back and start playing the event live stream again. The operation during this process is relatively cumbersome.

SUMMARY

The present disclosure provides a display method and apparatus for event livestreaming, a device and a storage medium, which can simplify an operation of a user during watching livestreaming. The technical solutions are as follows.

According to an aspect of the present disclosure, a display method for event livestreaming is provided, applied to a communication device, and including: displaying a livestreaming image of an event live stream in a livestreaming interface, the event live stream being a stream of an event in which one or more virtual characters play in a virtual environment; displaying a playback control corresponding to a target segment in the livestreaming interface, the target segment being a historical segment in the event live stream; and displaying, in response to a split screen display operation triggered based on the playback control, the livestreaming image in a first split screen area and displaying a playback image of the target segment in a second split screen area, the first split screen area and the second split screen area being different display areas in the livestreaming interface, and the first split screen area and the second split screen area having no intersection.

According to another aspect of the present disclosure, a display apparatus for event livestreaming is provided, including:

a display module, configured to display a livestreaming image of an event live stream in a livestreaming interface, the event live stream being a livestreaming stream of an event in which one or more virtual characters play in a virtual environment; the display module being further configured to display a playback control corresponding to a target segment in the livestreaming interface, the target segment being a historical segment in the event live stream; and the display module being further configured to display, in response to a split screen display operation triggered based on the playback control, the livestreaming image in a first split screen area and display a playback image of the target segment in a second split screen area, the first split screen area and the second split screen area being different display areas in the livestreaming interface, and the first split screen area and the second split screen area having no intersection.

According to another aspect of the present disclosure, a computer device is provided, and includes at least one processor and at least one memory, the at least one memory stores at least one instruction, at least one program, and a code set or an instruction set, and the at least one instruction, the at least one program, and the code set or the instruction set are loaded and executed by the at least one processor to implement the display method for the event livestreaming as described in the aspects above.

According to another aspect of the present disclosure, a non-transitory computer-readable storage medium is provided, and stores at least one instruction, at least one program, and a code set or an instruction set, and the at least one instruction, the at least one program, and the code set or the instruction set are loaded and executed by at least one processor to implement the display method for the event livestreaming as described in the aspects above.

The beneficial effects brought by the technical solutions provided by the present disclosure at least include: by displaying the playback control corresponding to the target segment of the event live stream in the livestreaming interface, and according to the split screen display operation triggered based on the playback control, split screen display of the livestreaming image of the event live stream and the playback image of the target segment can be achieved, so that a user can simultaneously watch the event livestreaming and play back the target segment. When playing back the target segment through the above mode, the user can simultaneously watch the event livestreaming without any operation, thereby simplifying an operation of the user of returning to watch the event livestreaming during the playback of the target segment.

BRIEF DESCRIPTION OF THE DRAWINGS

FIG. 3 is a schematic flowchart of a display method for event livestreaming provided by an exemplary embodiment of the present disclosure.

FIG. 4 is a schematic flowchart of a display method for event livestreaming provided by an exemplary embodiment of the present disclosure.

FIG. 20 is a schematic structural diagram of a display apparatus for event livestreaming provided by an exemplary embodiment of the present disclosure.

FIG. 21 is a schematic structural diagram of a display apparatus for event livestreaming provided by an exemplary embodiment of the present disclosure.

FIG. 22 is a schematic structural diagram of a terminal provided by an exemplary embodiment of the present disclosure.

DESCRIPTION OF EMBODIMENTS

First, terms involved in the embodiment of the present disclosure are introduced.

Virtual environment: is a virtual environment displayed (or provided) when an application program runs on a terminal. The virtual environment may be a simulation environment of a real world, or a semi-simulated and semi-fictional environment, or a purely fictional environment. The virtual environment may be any of a two-dimensional virtual environment, a 2.5-dimensional virtual environment, and a three-dimensional virtual environment, which is not limited by this embodiment of the present disclosure.

Virtual character: refers to at least one movable object controlled by a user in the virtual environment. The virtual character may be a virtual person, a virtual animal, an anime person, etc. In some embodiments, the virtual character is a three-dimensional model created based on an animated skeleton technology. Each virtual character has its own shape and volume in the virtual environment, and occupies a part of a space in the virtual environment.

Figure 1:
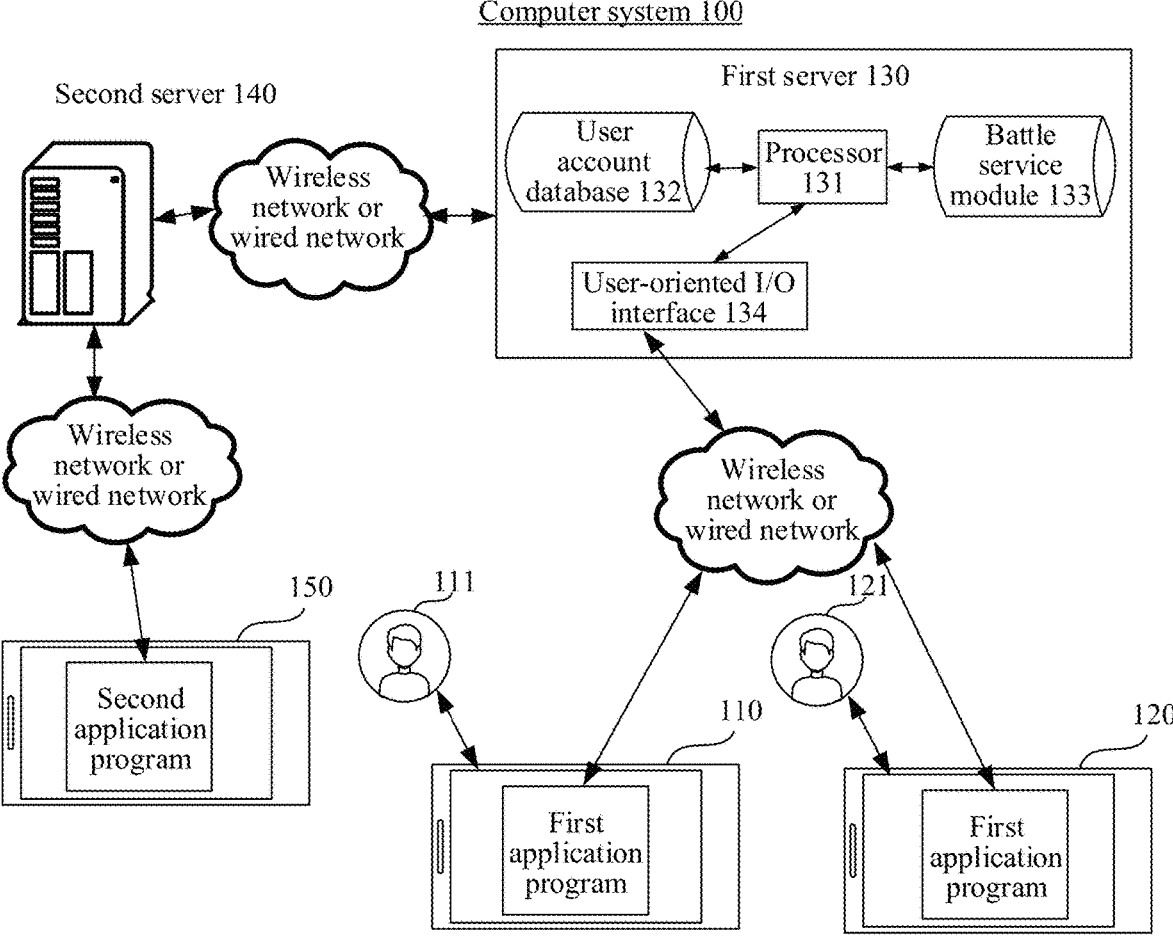
FIG. 1 is a structural block diagram of a computer system provided by an exemplary embodiment of the present disclosure.

FIG. 1 is a structural block diagram of a computer system provided by an exemplary embodiment of the present disclosure. The computer system 100 includes: a first terminal 110, a second terminal 120, a first server 130, a second server 140 and a third terminal 150.

A first application program is installed and run on the first terminal 110, and the first application program is a client with a competitive match function for an esports event. For example, the first application program supports the virtual environment, which may specifically be any of a first-person shooting (FPS) game, a third-personal shooting (TPS) game, an MOBA game, a tactical competitive game, and a simulation game (SLG). The first terminal 110 is a terminal used by a first user 111, and the first user 111 uses the first terminal 110 to control a virtual character located in the virtual environment in the first application program for activities. The virtual character may be referred to as the virtual character of the first user 111. The activities of the virtual character include, but are not limited to: at least one of adjusting a body posture, crawling, walking, running, cycling, flying, jumping, driving, picking, shooting, attacking, and throwing. Schematically, the virtual character is a virtual person character, such as a simulated person character or an animation person character.

The first application program is installed and run on the second terminal 120, and the first application program is the client with the competitive match function for an esports event. For example, the first application program supports the virtual environment, which may specifically be any of the FPS game, the TPS game, the MOBA game, the tactical competitive game, and SLG. The second terminal 120 is a terminal used by a second user 121, and the second user 121 uses the second terminal 120 to control the virtual character located in the virtual environment in the first application program for activities. The virtual character may be referred to as the virtual character of the second user 121. The activities of the virtual character include, but are not limited to: at least one of adjusting the body posture, crawling, walking, running, cycling, flying, jumping, driving, picking, shooting, attacking, and throwing. Schematically, the virtual character is a virtual person character, such as a simulated person character or an animation person character.

In some embodiments, the application programs installed on the first terminal 110 and the second terminal 120 are the same, or the application programs installed on the two terminals are the same type of application programs on different control system platforms. The first terminal 110 may refer to one of the plurality of terminals in general, and the second terminal 120 may refer to one of the plurality of terminals in general. For example, the first terminal 110 includes terminals used by users in a first team participating in esports event competitions, and the second terminal 120 includes terminals used by users in a second team participating in esports event competitions. This embodiment only takes the first terminal 110 and the second terminal 120 as an example for illustration. Device types of the first terminal 110 and the second terminal 120 are the same or different. The device types include: at least one of a smartphone, a tablet computer, an e-book reader, an MP3 player, an MP4 player, a laptop computer, and a desktop computer. The following embodiments take the terminal including the smartphone as an example for illustration.

The first terminal 110 and the second terminal 120 are connected to the first server 130 through a wireless network or a wired network.

The first server 130 includes at least one of one server, multiple servers, a cloud computing platform, and a virtualization center. The first server 130 is used for providing a background service for the first application program with the competitive match function of the esports event. In some embodiments, the first server 130 undertakes a master computing work, and the terminal undertakes a secondary computing work; or, the first server 130 undertakes the secondary computing work, and the terminal undertakes the master computing work; or, the first server 130 and the terminal adopt a distributed computing architecture for collaborative computing.

In a schematic example, the first server 130 includes a processor 131, a user account database 132, a battle service module 133, and a user-oriented input/output interface (I/O interface) 134. The processor 131 is used for loading an instruction stored in the first server 130, and process data in the user account database 132 and the battle service module 133. The user account database 132 is used for storing data of user accounts used by the first terminal 110, the second terminal 120, and other terminals, such as an avatar of the user account, a nickname of the user account, a combat effectiveness index of the user account, and a service area where the user account is located. The battle service module 133 is used for providing a plurality of battle rooms for the users to battle, for example, for the users to battle in battle rooms of the esports event. The user-oriented I/O interface 134 is used for establishing communication and exchanging data with the first terminal 110 and the second terminal 120 through the wireless network or the wired network.

The second server 140 is connected to the first server 130 through the wireless network or the wired network.

The second server 140 includes at least one of one server, multiple servers, the cloud computing platform, and the virtualization center. The second server 140 is a server corresponding to a second application program, and is used for providing a background service for the second application program with a livestreaming function of the esports event. In some embodiments, the second server 140 undertakes a master computing work, and the terminal undertakes a secondary computing work; or, the second server 140 undertakes the secondary computing work, and the terminal undertakes the master computing work; or, the second server 140 and the terminal adopt a distributed computing architecture for collaborative computing. The second server 140 is used for acquiring, in real time, audio and video data generated by the first server 130 during the implementation of esports event matches. In some embodiments, there are also a signal collecting device and a directed terminal between the first server 130 and the second server 140. The signal collecting device is used for collecting the audio and video data of the esports event through the first server 130 in real time, and importing it into the directed terminal. Afterwards, the directed terminal uploads the above audio and video data to the second server 140 through a network. The second server 140 may be referred to as a livestreaming server. In some embodiments, the first server 130 and the second server 140 are the same server.

The terminal 150 is connected to the second server 140 through the wireless network or the wired network.

A second application program is installed and run on the third terminal 150, and the second application program is a client with a livestreaming function for the esports event. For example, the second application program is a livestreaming client, a game client, a game community client, a video on demand client, a short video client, a social client, etc. The second application program acquires the audio and video data of esports event livestreaming sent by the second server 140 through the third terminal 150, and displays the same in a user interface to achieve the livestreaming function of the esports event. Device types of the third terminal 150, the first terminal 110 and the second terminal 120 are the same or different. The device types include: at least one of a smartphone, a tablet computer, an e-book reader, an MP3 player, an MP4 player, a laptop computer, and a desktop computer. The following embodiments take the terminal including the smartphone as an example for illustration.

In some embodiments, the above terminals and servers are both computer devices.

A person skilled in the art may be aware that the quantity of the terminals above may be more or fewer. For example, there may be only one terminal above, or there may be dozens or hundreds of terminals, or more. This embodiment of the present disclosure does not limit the quantity and device types of the terminals.

Figure 2:
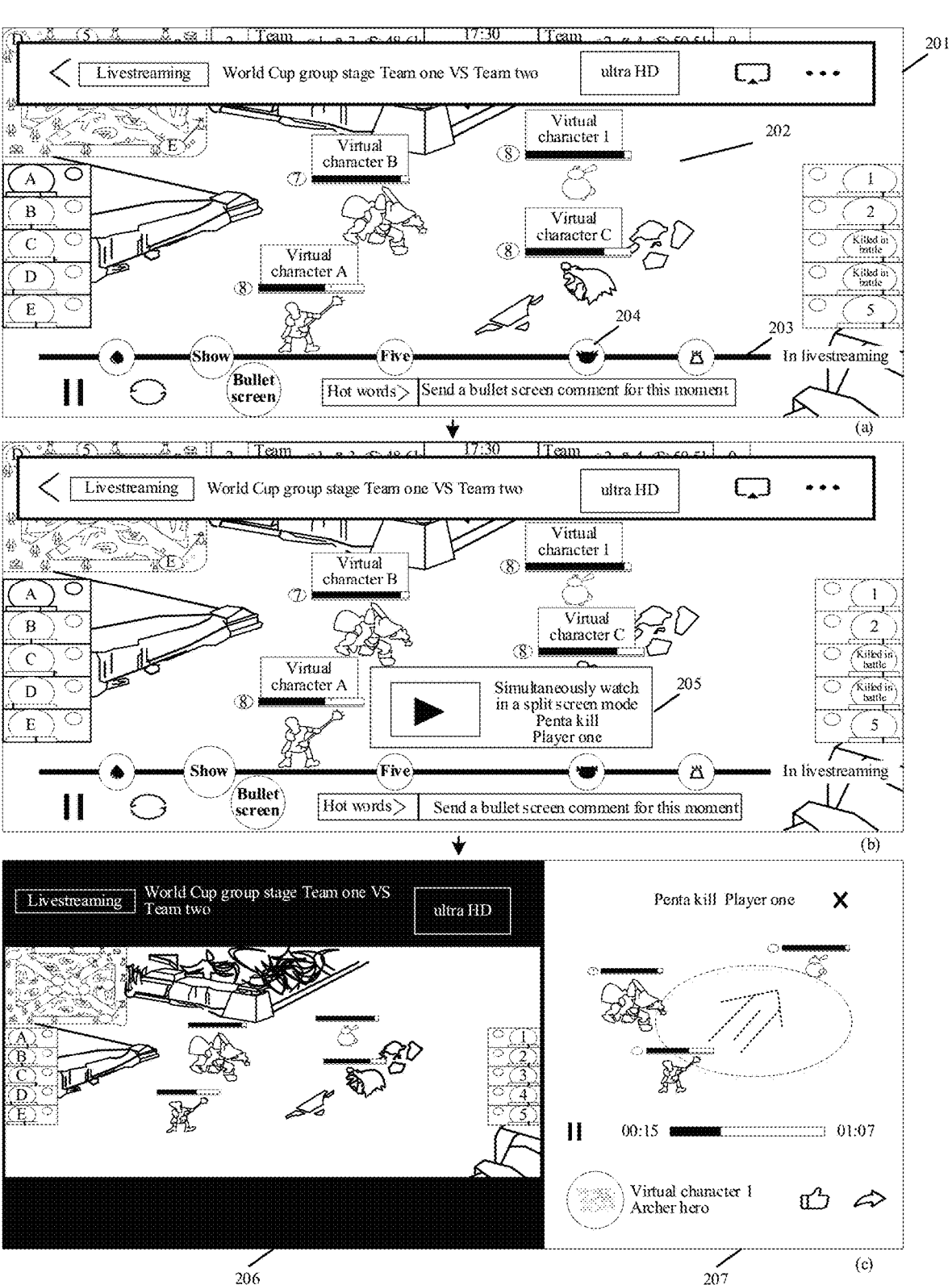
FIG. 2 is a schematic diagram of a livestreaming interface provided by an exemplary embodiment of the present disclosure.

FIG. 2 is a schematic diagram of a livestreaming interface provided by an exemplary embodiment of the present disclosure. As shown in (a) of FIG. 2, in a process of livestreaming of the esports event, a client that supports a livestreaming function of the esports event can display a livestreaming interface 201. A livestreaming image 202 of an event live stream is displayed in the livestreaming interface 201, and the event live stream is a livestreaming stream of an event in which one or more virtual characters play in a virtual environment. When determining that there is a target segment in the event live stream, the client may display a playback control 204 in the livestreaming interface 201 through at least one of a plurality of display modes. The target segment is determined by a server, and is a historical segment in the event live stream. For example, a progress bar 203 is displayed in the livestreaming interface 201, and the client may display the playback control 204 at a target progress location of the progress bar 203. The target progress location is used for indicating a corresponding playback progress of the target segment in the event live stream. Upon acquiring the plurality of target segments, the client displays the plurality of playback controls 204 in the progress bar 203 according to the above rules.

In some embodiments, the playback control 204 can directly trigger a split screen display operation, or trigger a detail display operation. In response to that the playback control 204 directly triggers the split screen display operation, as shown in (c) of FIG. 2, in response to the split screen display operation triggered by the playback control 204, the client may display the livestreaming image 202 and a playback image of the target segment in the livestreaming interface in a split screen mode. In response to that the playback control 204 triggers the detail display operation, as shown in (b) of FIG. 2, in response to the detail display operation triggered by the playback control 204, the client may display a detail introduction control 205 corresponding to the target segment in the livestreaming interface 201, for example, the detail introduction control 205 is displayed above the playback control 204. Information for introducing the target segment is displayed in the detail introduction control 205.

As shown in (c) of FIG. 2, the detail introduction control 205 can trigger the split screen display operation, in response to the split screen display operation triggered by the detail introduction control 205, the client may display the livestreaming image 202 and the playback image of the target segment in the livestreaming interface in a split screen mode. The client displays the livestreaming image 202 in a first split screen area 206 in the livestreaming interface 201, and displays the playback image in a second split screen area 207 in the livestreaming interface 201. A first display area and a second display area are different display areas in the livestreaming interface 201. According to an exit operation of a user for the displayed playback image, the client can cancel the display of the playback image and restore the display of the livestreaming image 202 only in the livestreaming interface 201. Moreover, in response to that the event live stream includes the plurality of target segments and in response to a switching operation for the displayed playback image, the client may display the playback images of the different target segment of the event live stream in a switch mode according to a time sequence.

By displaying the playback control corresponding to the target segment of the event live stream in the livestreaming interface, and according to the split screen display operation triggered based on the playback control, split screen display of the livestreaming image of the event live stream and the playback image of the target segment can be achieved, so that a user can simultaneously watch the event livestreaming and play back the target segment. When playing back the target segment through the above mode, the user can simultaneously watch the event livestreaming without any operation, thereby simplifying an operation of the user of returning to watch the event livestreaming during the playback of the target segment.

FIG. 3 is a schematic flowchart of a display method for event livestreaming provided by an exemplary embodiment of the present disclosure. The method is executed by a computer device, for example, the method may be used for a third terminal or a client on the third terminal in the system shown in FIG. 1. As shown in FIG. 3, the method includes the following steps:

Step 302: Display a livestreaming image of an event live stream in a livestreaming interface.

The livestreaming interface is a user interface displayed by a client that supports an event livestreaming function when providing the event livestreaming function. In some embodiments, an event refers to an esports event, the esports event is an event where esports players compete by controlling virtual characters in a virtual environment. For example, competing is performed through an FPS game, a TPS game, an MOBA game, etc. In the esports event, there are at least two teams participating in the competition, and each team has at least one esports player. Each esports player controls at least one virtual character in the virtual environment to compete with virtual characters controlled by esports players from other teams in the virtual environment.

In some embodiments, the above event can further refer to a match performed by using a client that supports the control of the virtual character in the virtual environment for a match function. Exemplarily, the match includes that the plurality of players are online through the above client that supports the control of the virtual character in the virtual environment for the match function, so as to control their own virtual characters to match with virtual characters controlled by other players in the virtual environment; and that the players control their own virtual characters to match with a man-machine character in the virtual environment by using the above client. The players include regular players in the client and anchors. The human-machine character is a virtual character controlled by the above client or the server of the above client. For example, the event refers to a match conducted by a plurality of game anchors using the MOBA game conducted online.

Exemplarily, in an esports event conducted based on the MOBA game, two teams participate in each competition, with five esports players from each team participating in the competition, and each esports player controls one virtual character to compete in the virtual environment in the MOBA game. The virtual environment is a virtual environment displayed (or provided) when the MOBA game runs on the terminal. The virtual environment may be a simulation environment of a real world, or a semi-simulated and semi-fictional environment, or a purely fictional environment. The virtual character refers to at least one movable object controlled by the user in the virtual environment. The virtual character may be a virtual person, a virtual animal, an anime person, etc.

The event live stream is a livestreaming stream of an event that competes based on the virtual character in the virtual environment. That is, the event live stream is a livestreaming stream generated by the esports event. Exemplarily, the displayed livestreaming image includes an image of the virtual character competing in the virtual environment, an image of a commentator commenting on the esports event, an image of a preparation stage during the match, etc. The client acquires the event live stream from the server, thereby displaying the livestreaming image of the event live stream in the livestreaming interface.

Step 304: Display a playback control corresponding to a target segment in the livestreaming interface.

The target segment is a historical segment in the event live stream. The target segment is generated based on a behavior of the virtual character, that is, the target segment is generated based on a manipulation behavior of the player on the virtual character controlled by the player. The user who watches the event livestreaming may be interested in some highlight behaviors of the players manipulating the virtual characters, so there will be the target segment. For example, the target segment is a segment that a virtual character controlled by a player in a first team participating in the competition consecutively defeats virtual characters controlled by all players in a second team participating in the competition. The event live stream includes one or more target segments, or the event live stream does not include the target segment.

In some embodiments, the target segment is determined by a server or the client on the terminal, or manually determined in the event live stream and sent to the client via the server or directly to the client. Taking determination of the target segment by the server as an example, and when acquiring the event live stream, the server acquires running parameters generated by an application program of the event. The running parameters are generated based on an operational behavior of the esports player using the application program. That is, the running parameters are generated based on the behavior of the virtual character controlled by the esports player in the virtual environment. The running parameters are used for reflecting a progress of the esports event. For example, during a certain period of time, a virtual character controlled by certain player uses skills of that virtual character to defeat a virtual character controlled by another player. The server can determine the target segment in the event live stream based on a target segment parameter condition according to the above running parameters, and the target segment parameter condition is set for the running parameters generated in the ongoing process of the event corresponding to the event live stream. For example, the target segment parameter condition includes that the running parameters reflect the certain virtual character consecutively defeating three other virtual characters within a preset duration, and when the server determines that the running parameters meet the above target segment parameter condition, the server determines the segment that generates the running parameters in the event live stream as the target segment. The server determines the target segment in the event live stream at regular time or determines the target segment in the event live stream in real time. The target segment parameter condition is manually determined. When determining that there is the target segment in the event live stream, the server may indicate the determined result to the client, or the client requests the determined result. In some embodiments, the client can also determine the target segment in the event live stream through the above mode. That is, after acquiring the event live stream through the server, the client judges whether there is the target segment in the event live stream through the above mode and acquires the determined target segment.

When determining that the event live stream includes the target segment, the client may display the playback control corresponding to the target segment in the livestreaming interface. In some embodiments, in response to that the event live stream includes the plurality of target segments, the client displays the plurality of playback controls in the livestreaming interface. Each playback control represents one target segment. Or, the client displays one playback control in the livestreaming interface, and this playback control can represent the plurality of target segments present in the event live stream. The client can display the playback control corresponding to the target segment in the livestreaming interface through at least one of the plurality of display modes.

In some embodiments, the plurality of display modes include a mode to display the playback control directly in the livestreaming interface, which may specifically include at least one of displaying the playback control in a progress bar of the livestreaming interface (displaying one or more playback controls, representing one or more candidate target segments of the event live stream), displaying the playback control on a periphery of a target virtual character (displaying one or more playback controls, representing one or more candidate target segments corresponding to the target virtual character), displaying the playback controls at a top or bottom in the livestreaming interface (displaying one playback control, representing one or more target segments of the event live stream), and displaying a floating and movable playback control in the livestreaming interface (displaying one playback control, representing one or more target segments of the event live stream). The plurality of display modes further include a mode to display the playback control indirectly, which may specifically include at least one of displaying the playback control in a playback list displayed in the livestreaming interface based on a playback list display operation (displaying one or more playback controls, representing one or more candidate target segments of the event live stream), displaying the playback control on a periphery of a target virtual character upon triggering a control display operation through the target virtual character (displaying one or more playback controls, representing one or more target segments corresponding to the target virtual character), and displaying the playback control in the livestreaming interface upon triggering the control display operation through a gesture operation (displaying one or more playback controls, representing one or more target segments of the event live stream).

The above target virtual character is a virtual character whose behavior generates the target segment, and the target segment corresponding to the target virtual character means that the target segment is generated based on the target virtual character. The playback control is displayed in a form of a button, a floating layer, a pop-up window, a list, an icon, a picture, a dynamic graph, and so on. For example, the client displays the playback control in the progress bar of the livestreaming interface. The playback control is displayed as a round button, an icon is displayed in the button, and the icon is used for indicating a type of content of the target segment.

Step 306: Display, in response to a split screen display operation triggered based on the playback control, the livestreaming image in a first split screen area and display a playback image of the target segment in a second split screen area.

The first split screen area and the second split screen area are different display areas in the livestreaming interface, and the first split screen area and the second split screen area have no intersection. In some embodiments, the first split screen area and the second split screen area belong to different views in the livestreaming interface. The livestreaming image is an image displayed by the client by playing the event live stream acquired in real time. The playback image is an image displayed by the client by playing video resources of the target segment. The video resources of the target segment are acquired by the client through the server or acquired by intercepting the event live stream after the client determines the target segment on its own.

In response to that the playback control corresponds to one target segment, the client may display the playback image of the target segment corresponding to the playback control. In response to that the playback control corresponds to the plurality of target segments, the client may display the playback image of the target segment of the event live stream according to the time sequence, or randomly selects the currently played target segment from the target segments in the event live stream, or select the currently played target segment from the target segments of the event live stream according to a sorting condition. The sorting condition includes the number of likes, the number of comments, the number of plays, and quantity of gifts for different target segments, and virtual characters controlled by users' favorite players.

In some embodiments, in response to that the types of the content of the target segments are different, the client uses a different display ratio for the second split screen area when displaying them in a split screen mode. For example, if the type of the content of the target segment is that the certain virtual character only defeats another virtual character, the required display range is small, and a display ratio of 1:1 may be used. If the type of the content of the target segment is that the certain virtual character consecutively defeats five other virtual characters, the required display range is large, and a display ratio of 16:9 may be used.

The playback control can directly trigger the split screen display operation. For example, in response to the split screen display operation triggered by the playback control, the client can directly display the livestreaming image and the playback image in a split screen mode. Or, the playback control can trigger a detail display operation. In response to the detail display operation triggered by the playback control, the client may display an introduction control for introducing the target segment. Afterwards, based on a split screen display operation triggered by the introduction control, the client displays the livestreaming image and the playback image in a split screen mode.

In some embodiments, in response to that the playback control corresponds to one target segment, the client may display an introduction control used for introducing the target segment corresponding to the playback control. In response to that the playback control corresponds to the plurality of target segments, the client may display an introduction control used for introducing all the target segments. The introduction control may be displayed in a form of a floating layer, a pop-up window, a list, etc. In response to that the introduction control is used for introducing the plurality of target segments, information for introducing the different target segments in the introduction control based on a sliding operation on the introduction control. The above triggering the operation through the control refers to triggering the operation by clicking, double clicking, multiple clicking, sliding, long pressing on the control.

To sum up, according to the method provided by this embodiment, by displaying the playback control corresponding to the target segment of the event live stream in the livestreaming interface, and according to the split screen display operation triggered based on the playback control, split screen display of the livestreaming image of the event live stream and the playback image of the target segment can be achieved, so that the user can simultaneously watch the event livestreaming and play back the target segment. When playing back the target segment through the above mode, the user can simultaneously watch the event livestreaming without any operation, thereby simplifying an operation of the user of returning to watch the event livestreaming during playback of the target segment.

FIG. 4 is a schematic flowchart of a display method for event livestreaming provided by an exemplary embodiment of the present disclosure. The method is executed by a computer device, for example, the method may be used for a third terminal or a client on the third terminal in the system shown in FIG. 1. As shown in FIG. 4, the method includes the following steps:

Step 402: Display a livestreaming image of an event live stream in a livestreaming interface.

The livestreaming interface is a user interface displayed by a client that supports an event livestreaming function when providing the event livestreaming function. In some embodiments, the event refers to an esports event. The event live stream is a livestreaming stream of an event in which one or more virtual characters play in a virtual environment. That is, the event live stream is a livestreaming stream generated by the esports event. When displaying the livestreaming interface, the client may acquire the event live stream from a server in real time.

Step 404: Acquire a detection result of the server for whether there is a target segment in the event live stream.

The target segment is a historical segment in the event live stream. The target segment is a segment that may be of interest to a user who watches the event livestreaming. The target segment is determined by the server, or manually determined in the event live stream. When acquiring the event live stream, the server may acquire running parameters generated by an application program of the event. The running parameters are generated based on an operational behavior of an esports player using the application program. That is, the running parameters are generated based on the behavior of the virtual character controlled by the esports player in the virtual environment. The running parameters are used for reflecting a progress of the esports event. The server can determine the target segment in the event live stream based on a target segment parameter condition according to the above running parameters, and the target segment parameter condition is set for the running parameters generated in the ongoing process of the event corresponding to the event live stream. When the server determines that the running parameters within a certain period of time meet the target segment parameter condition, the server may determine the segment that generates the running parameters in the event live stream as the target segment. The server determines the target segment in the event live stream at regular time or determines the target segment in the event live stream in real time. The target segment parameter condition is manually determined. In some embodiments, the client can also determine the target segment in the event live stream through the above mode.

When determining that there is the target segment in the event live stream, the server may indicate the determined result of where there is the target segment in the event live stream to the client, or the client requests the detection result actively.

Exemplarily, Table 1 shows introduction of a target segment in the event live stream of an MOBA-based game:

TABLE 1

| Type | Icon | Highlight moment event name | Detailed description |
|---|---|---|---|
| First blood | First form | First blood | |
| Killing | Second form | Triple kill | |
| | Third form | Quadra kill | |
| | Fourth form | Penta kill | |
| Incredible operation | Fifth form | Fabulous | Use a skill in ace to control multiple enemy heroes and cause them to be slain |
| | | Marvelous | Use a skill in ace to control five enemy heroes and cause them to be slain |

TABLE 1-continued

| Type | Icon | Highlight moment event name | Detailed description |
|---|---|---|---|
| | | Fabulous | Use a skill in ace to control enemy heroes first and cause them to be slain |
| | | Key ace output | Cause more than 50% of team output and slaying in ace |
| | | Marvelous | Cause more than 90% of team output and slaying in ace |
| | | Fabulous | Bear more than 50% of enemy team output and cause slaying in ace |
| | | Fabulous | Bear more than 90% of enemy team output and cause slaying in ace |
| | | Your team has reclaimed the crucial kill | Successfully snatch and kill key neutral creatures from the enemy camp |
| | | Nice Killing | Slay enemy heroes after a long-range hit skill |
| | | Another day | Counter kill enemy heroes with extremely low blood |
| | | Nice killing | Connect and flash to slay enemy heroes after using the skill |
| | | Nice killing | Slay enemy heroes by cleverly using turret |
| | | Showtime | Instantly kill enemy heroes by using skill or normal attack |
| | | Equipment replacement | Counter kill enemy heroes after quickly replacing life-saving equipment |
| | | Fabulous | The first hero uses a skill for teleportation for multiple times in a short period of time to slay enemy heroes |
| | | Nice killing | The second hero uses skills to shuttle through a battlefield in a short period of time to slay enemy heroes |
| | | Nice killing | The third hero refreshes multiple skills in a short period of time to slay the enemy heroes |
| | | Nice killing | The fourth hero uses skills to shuttle through a battlefield in a short period of time to slay enemy heroes |
| | | Nice killing | The fifth hero uses skills to shuttle through a battlefield in a short period of time to slay enemy heroes |
| | | Nice killing | The sixth hero uses skills to shuttle through a battlefield in a short period of time to slay enemy heroes |
| | | Night Harvester | The seventh hero uses skills to shuttle through a battlefield in a short period of time to slay enemy heroes |
| | | Open fire | The eighth hero refreshes a reset skill for multiple times in a short period of time to slay enemy heroes |
| Killing the neutral creatures | Sixth form | Killing first neutral creatures | |
| | Seventh form | Killing second neutral creatures | |
| | Eighth form | Killing third neutral creatures | |
| Building | Ninth form | Pull down a base turret | |

As shown in Table 1, the content in each row is an introduction for one highlight/desired/target moment event (target segment). The highlight moment event in each row corresponds to a target segment parameter condition, and the corresponding target segment parameter condition is used for reflecting the running parameters indicating the occurrence of the highlight moment event. Each highlight moment event corresponds to a type, an icon, a name, and a detailed description. When determining the target segment through the target segment parameter condition corresponding to the highlight moment event in each row, not only can the target segment be determined, but also the type of the content of the target segment can be determined. The type of the target segment in Table 1 may include at least one of the virtual character defeating at least one enemy virtual character, the virtual character releasing a skill to the enemy virtual character, the virtual character defeating the neutral creatures in the virtual environment, and the virtual character destroying an enemy building. Corresponding to the content of each type of target segment above, more refined classification can further be performed according to the content in Table 1.

"First blood" refers to that in a match between two teams participating in competition, for the first time, a player in one team controls a virtual character to defeat a virtual character controlled by a player in another team. "Triple kill" refers to that in the match between the two teams participating in competition, the player in one team controls the virtual character to consecutively defeat the virtual characters respectively controlled by three players in another team in a short period of time. "Quadra kill" refers to that in the match between the two teams participating in competition, the player in one team controls the virtual character to consecutively defeat the virtual characters respectively controlled by four players in another team in a short period of time. "Penta kill" refers to that in the match between the two teams participating in competition, the player in one team controls the virtual character to consecutively defeat the virtual characters controlled by five players (all the players) in another team in a short period of time.

"Ace" refers to that in the match between the two teams participating in competition, the players in the two teams control the virtual characters to engage in a battle. Heroes refer to the virtual characters controlled by the players, the virtual characters have the skills, and the different virtual characters have the same or different skills. Using the skill to control heroes refers to that the players control the virtual characters to apply control skills to the enemy virtual characters, and the control skills can achieve the effect of limiting the movement of the enemy virtual characters. The output of the virtual characters refers to a numerical value of a damage caused by the virtual characters to the enemy virtual characters through normal attacks or skill applying. The flash skill is a skill that makes the virtual characters achieve teleportation by a certain distance. The life-saving equipment is equipment for enhancing their survival ability during virtual equipment that the virtual characters can wear. Neutral creatures are resources that need to be looted in the virtual environment. The virtual characters that snatch the neutral creatures can acquire gain effects, such as enhancing attack power and enhancing defensive power. The different neutral creatures correspond to the different gain effects. A camp where the virtual characters are located includes the plurality of turrets. In an MOBA game, if a virtual character from one camp destroys all turrets of another camp, it is considered that the virtual character of that camp has won the game. A base turret is a special turret in the camp where the virtual characters are located. In response to that one's own base turret is destroyed, the enemy can obtain a Buff effect.

Step 406: Display, in response to that there is the target segment in the event live stream, the playback control corresponding to the target segment in the livestreaming interface.

When determining that the event live stream includes the target segment, the client may display the playback control corresponding to the target segment in the livestreaming interface. The playback control is used for playing back the target segment. In some embodiments, the client displays the plurality of playback controls in the livestreaming interface, and each playback control represents one target segment. Or, the client displays one playback control in the livestreaming interface, and this playback control represents one or more target segments present in the event live stream.

In some embodiments, the client displays the playback control through one or more of the following display modes. First Display Mode:

Upon receiving a progress bar display operation, the client may display a progress bar in the livestreaming interface. The progress bar is used for reflecting a playing progress of the event live stream. Exemplarily, the progress bar display operation is triggered for a touch operation in an area where only the livestreaming image is displayed in the livestreaming interface. In some embodiments, continuing to refer to FIG. 2, when the progress bar is displayed, the client further may display relevant information of the event live stream, a control used for controlling the playing of the event live stream, a control used for publishing a bullet screen comment, and a control used for opening or closing the bullet screen displayed in the livestreaming interface. When displaying the progress bar, the client may display the playback control at a target progress location of the progress bar, and the target progress location is used for indicating a corresponding playback progress of the target segment in the event live stream. In some embodiments, in response to that the event live stream includes the plurality of target segments, the client displays the plurality of playback controls in the progress bar. Each playback control represents one target segment in the event live stream.

Exemplarily, in response to that the target progress location is used for indicating a corresponding playing progress of a start moment of the target segment in the event live stream, the event live stream has currently played at 02:00: 00, the start moment of the target segment is 01:00:00, and then the target progress location is a middle location of the progress bar. The event live stream is played in a livestreaming mode, so the total playing duration is accumulated over time, and the target progress location is also updated with a livestreaming process of the event live stream. For example, for the same target segment, a target progress location corresponding to a first moment is one third of the progress bar, a target progress location corresponding to a second moment is one sixth of the progress bar, and the first moment is before the second moment.

In some embodiments, the playback control corresponds to a plurality of display forms. At least one of a shape of the playback control, an icon (or text) displayed in the playback control, and a color of the playback control are different in different display forms. For example, in different display forms, the playback controls are displayed as circular buttons, but the icons (or text) displayed in the circular buttons are different. The icons (or text) displayed in the circular buttons are used for reflecting the type of the content of the target segment corresponding to the display control. When displaying the playback control at the target progress location of the progress bar, the client may display a playback control of a target form. The target form is a display form corresponding to the type of the content of the target segment among the display forms of the playback control.

Exemplarily, continuing to refer to Table 1, and Table 1 shows the nine display forms of the playback control and a corresponding relationship between each display form and the type of the content of the target segment. Each display form is the circular button, but there are differences in the icons (or text) in the circular button. For example, when the target segment is "Triple kill", the playback control is a circular button with "three" displayed in the middle. When the target segment is "Pull down a base turret", the playback control is a circular button with an icon of the turret displayed in the middle.

In addition to determining the type of the content of the target segment based on the target segment parameter condition shown in Table 1, data related to the target segment can further be identified through a machine learning model, thereby determining the type of the content of the target segment. In some embodiments, the client determines the type of the content of the target segment through at least one model of a first machine learning model, a second machine learning model, a third machine learning model, and a fourth machine learning model. The first machine learning model, the second machine learning model, the third machine learning model and the fourth machine learning model above are models constructed based on a neural network (NN).

The first machine learning model predicts the type of the content of the target segment by identifying the playback image of the target segment. The client may input the target segment into the first machine learning model to obtain the type of the content of the target segment predicted by the first machine learning model. The first machine learning model is obtained by training playback images of sample segments and types of contents of the sample segments (a real type of content of the sample segment). For example, the sample segment is input into the first machine learning model to obtain the predicted type of the content of the sample segment, and then error loss between the predicted type of the content of the sample segment and the real type of the content of the sample segment is determined, and the first machine learning model may be trained through the error loss. The sample segment used by training the model and the type of the content of the sample segment are manually determined based on a historical event live stream.

The second machine learning model predicts the type of the content of the target segment by identifying audio of the target segment. The client may input the audio of the target segment into the second machine learning model to obtain the type of the content of the target segment predicted by the second machine learning model. The second machine learning model is obtained by training audios of the sample segments and the types of contents of the sample segments. For example, the audio of the sample segment is input into the second machine learning model to obtain the predicted type of the content of the sample segment, and then error loss between the predicted type of the content of the sample segment and the real type of the content of the sample segment is determined, and the second machine learning model may be trained through the error loss. The audio of the target segment is acquired in the target segment, and the audio of the sample segment is acquired in the sample segment.

The third machine learning model predicts the type of the content of the target segment by identifying commentary audio corresponding to the target segment. The client may input the commentary audio corresponding to the target segment into the third machine learning model to obtain the type of the content of the target segment predicted by the third machine learning model. The third machine learning model is obtained by training commentary audios corresponding to the sample segments and the types of contents of the sample segments. For example, the commentary audio corresponding to the sample segment is input into the third machine learning model to obtain the predicted type of the content of the sample segment, and then error loss between the predicted type of the content of the sample segment and the real type of the content of the sample segment is determined, and the third machine learning model may be trained through the error loss. The commentary audio corresponding to the target segment is generated by commenting the target segment by a commentator of the event, and the commentary audio corresponding to the sample segment is generated by commenting the sample segment by the commentator of the event.

The fourth machine learning model predicts the type of the content of the target segment by identifying user operation data corresponding to the target segment. The client may input the user operation data corresponding to the target segment into the fourth machine learning model to obtain the type of the content of the target segment predicted by the fourth machine learning model. The fourth machine learning model is obtained by training user operation data corresponding to the sample segments and the types of contents of the sample segments. For example, the user operation data corresponding to the sample segment is input into the fourth machine learning model to obtain the predicted type of the content of the sample segment, and then error loss between the predicted type of the content of the sample segment and the real type of the content of the sample segment is determined, and the fourth machine learning model may be trained through the error loss. The user operation data corresponding to the target segment are operation data generated by the user manipulating the virtual characters in the target segment during the target segment. The user operation data corresponding to the sample segment are operation data generated by the user manipulating the virtual characters in the sample segment during the sample segment.

When determining the type of the content of the target segment through various machine learning models above, the client may determine the type through the number of repetitions of the type of the content of the target segment predicted by different models. In some embodiments, the client can further determine the number of repetitions above based on weights corresponding to the different models. For example, if the type determined by the first machine learning model is A with a weight of 1, the type determined by the second machine learning model is B with a weight of 3, and the type determined by the third machine learning model is A with a weight of 1, the client determines the number of repetitions of the type A as 1+1=2, and the client determines the number of repetitions of type B as 3, so that the client determines the type B as a prediction result. In some embodiments, the server can also determine the type of the content of the target segment through the above model, and send a determination result to the client to alleviate a computational pressure on a client side. Through the above model, the type of the content of the target segment is automatically determined based on artificial Intelligence (AI), and the accuracy of the determined result is high.

Exemplarily, continuing to refer to FIG. 2, for the playback control displayed on a far left of the progress bar, the corresponding target segment is a target segment of "First blood" in Table 1. For the second playback control displayed on a left side of the progress bar, the corresponding target segment is a target segment of "Highlight operation" in Table 1.

In response to that the client displays the plurality of playback controls in the progress bar, in order to facilitate the user to click the playback control on a terminal with a small display screen, a distance between the two adjacent playback controls displayed in the progress bar is not less than a distance threshold, that is, a distance between the two adjacent target progress locations is not less than the distance threshold. Exemplarily, the distance threshold represents 2 minutes in the progress bar. The longer the playing duration of the event live stream is, the shorter the distance threshold is in the livestreaming interface. In some embodiments, in response to that the client detects that the distance between the two target progress locations is less than the distance threshold, the display of one of the playback controls is canceled, or the distance between the two target progress locations is increased appropriately to make it greater than the distance threshold. In addition, the quantity of the playback controls displayed by the client in the progress bar is less than a quantity threshold. Exemplarily, the quantity threshold is 16. Or, in a process of determining the target segment, the quantity of the determined target segments does not exceed the above quantity threshold.

Figure 5:
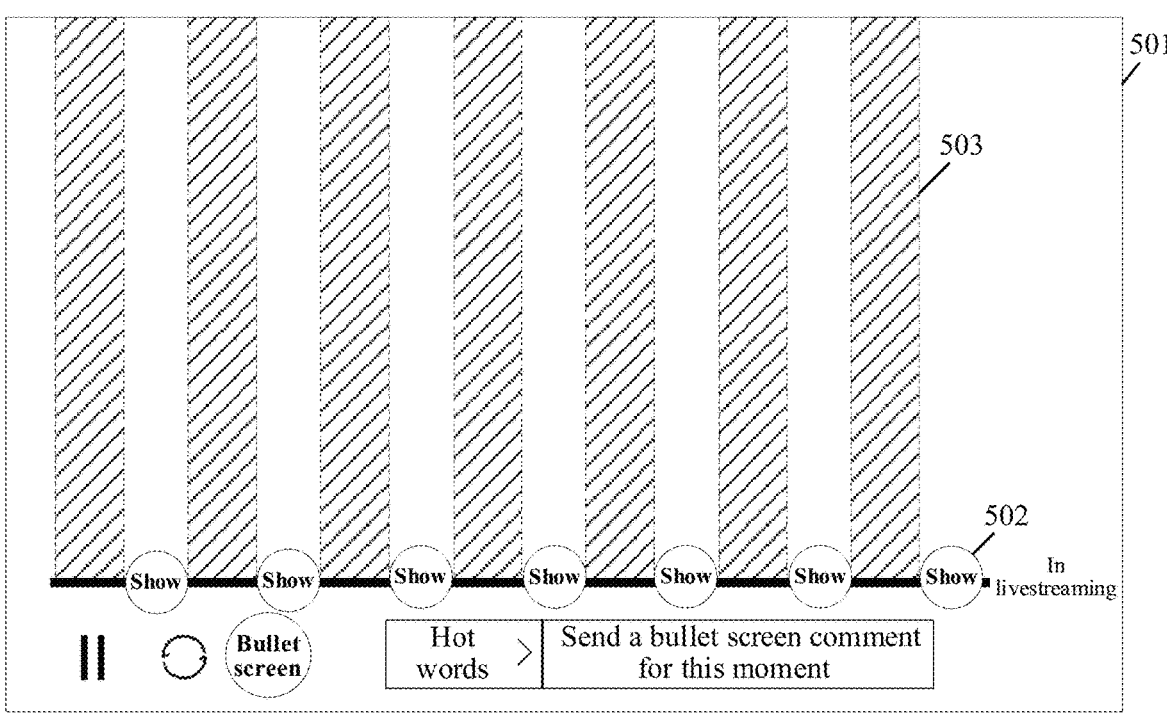
FIG. 5 is a schematic diagram of a distance threshold provided by an exemplary embodiment of the present disclosure.

Exemplarily, FIG. 5 is a schematic diagram of a distance threshold provided by an exemplary embodiment of the present disclosure. Seven playback controls are displayed in the progress bar of the livestreaming interface 501, and a distance between every two playback controls is greater than the distance threshold 503. Moreover, the distance between a first playback control and a starting point of the progress bar is also greater than the distance threshold 503.

Second Display Mode:

In some embodiments, the virtual environment is displayed in the livestreaming image displayed by the client, and the target virtual character exists in the virtual environment. The client may display a playback control of a target segment corresponding to the target virtual character on a periphery of the target virtual character, for example, the client displays the playback control of the target segment corresponding to the target virtual character above the target virtual character. The target segment corresponding to the target virtual character is generated based on a behavior of the target virtual character. There is one or more target segments corresponding to the target virtual character. In some embodiments, there is one or more displayed playback controls. When the plurality of playback controls are displayed, each playback control represents one target segment of the target virtual character. Upon generating the target segment based on the behavior of the certain virtual character, the virtual character can become the target virtual character. For example, if the behavior of the certain virtual character meets the "First blood" in Table 1, the target segment corresponding to the virtual character is generated, and the virtual character becomes the target virtual character.

The playback controls displayed by the client on peripheries of the different target virtual characters have the same or different display forms. For example, a circular button with a "return" displayed in the middle is used for displaying the playback control to prompt the user that the virtual character has the corresponding target segment. The client can further display the playback control on the periphery of the target virtual character according to the type of the content of the target segment corresponding to the target virtual character.

Figure 6:
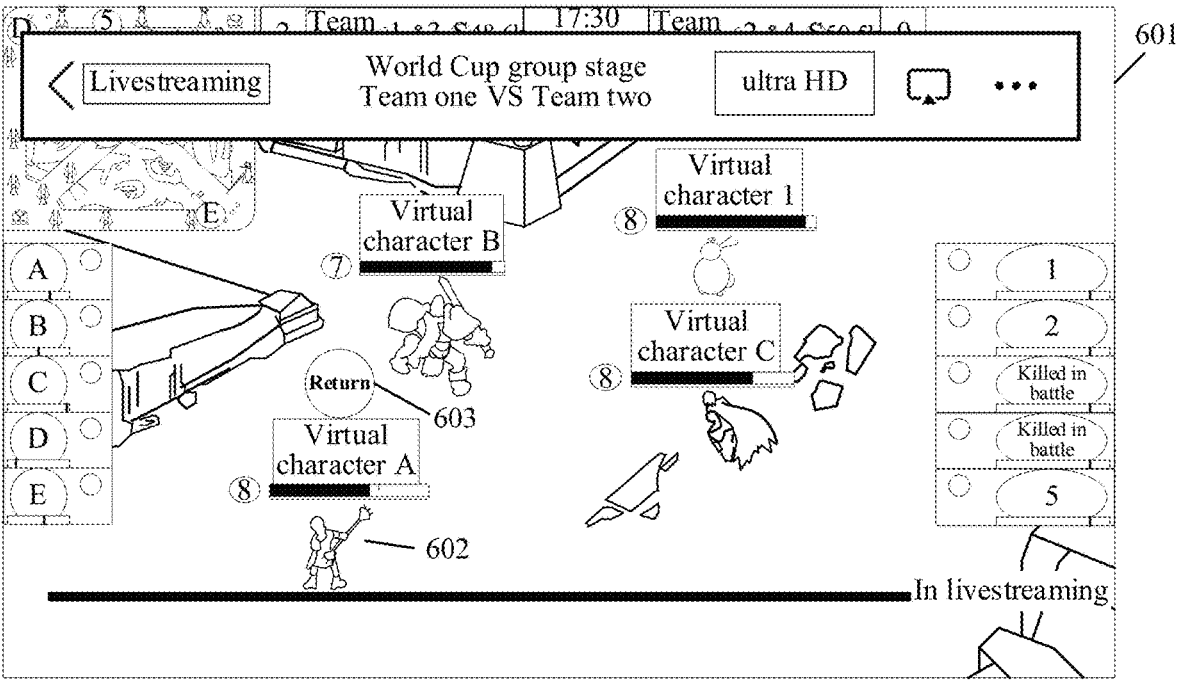
FIG. 6 is a schematic diagram of a playback control provided by an exemplary embodiment of the present disclosure.

Exemplarily, FIG. 6 is a schematic diagram of a playback control provided by an exemplary embodiment of the present disclosure. As shown in FIG. 6, the virtual environment is displayed in the livestreaming interface 601, and one target virtual character 602 exists in the virtual environment. The client may display the playback control 603 above the target virtual character 602, and the playback control 603 is displayed as a circular button with a "return" in the middle, for prompting the user that the virtual character has the corresponding target segment.

Third Display Mode:

In some embodiments, the virtual environment is displayed in the livestreaming image, the target virtual character exists in the virtual environment, and the client may display a highlighting mark on the target virtual character. In response to a control display operation triggered based on the target virtual character, the client may display the playback control of the target segment corresponding to the target virtual character on the periphery of the target virtual character, for example, the client displays the playback control of the target segment corresponding to the target virtual character above the target virtual character. The target segment corresponding to the target virtual character is generated based on the behavior of the target virtual character. There is one or more target segments corresponding to the target virtual character. In some embodiments, there is one or more displayed playback controls. When the plurality of playback controls are displayed, each playback control represents one target segment of the target virtual character. Upon generating the target segment based on the behavior of the certain virtual character, the virtual character can become the target virtual character.

The highlight mark displayed on the target virtual character is used for highlighting the target virtual character, that is, for prompting the user that the virtual character has the corresponding target segment. This highlighting mark includes highlighting a name of the displayed target virtual character, displaying a border for the target virtual character, or flicking displaying of the target virtual character.

In some embodiments, when receiving operations such as clicking, double clicking, multiple clicking, sliding and long pressing for the target virtual character, the client may confirm receipt of the above control display operation.

The playback controls displayed by the client on peripheries of the different target virtual characters have the same or different display forms. For example, the circular button with the "return" displayed in the middle is used for displaying the playback control. The client can further display the playback control on the periphery of the target virtual character according to the type of the content of the target segment corresponding to the target virtual character. If the display duration is greater than the duration threshold, the client may cancel the display of the highlighting mark and playback controls above. The display duration is a duration between the start moment of the target segment corresponding to the target virtual character and a current moment, such as a duration between a start moment of a latest target segment of the target virtual character and the current moment.

Figure 7:
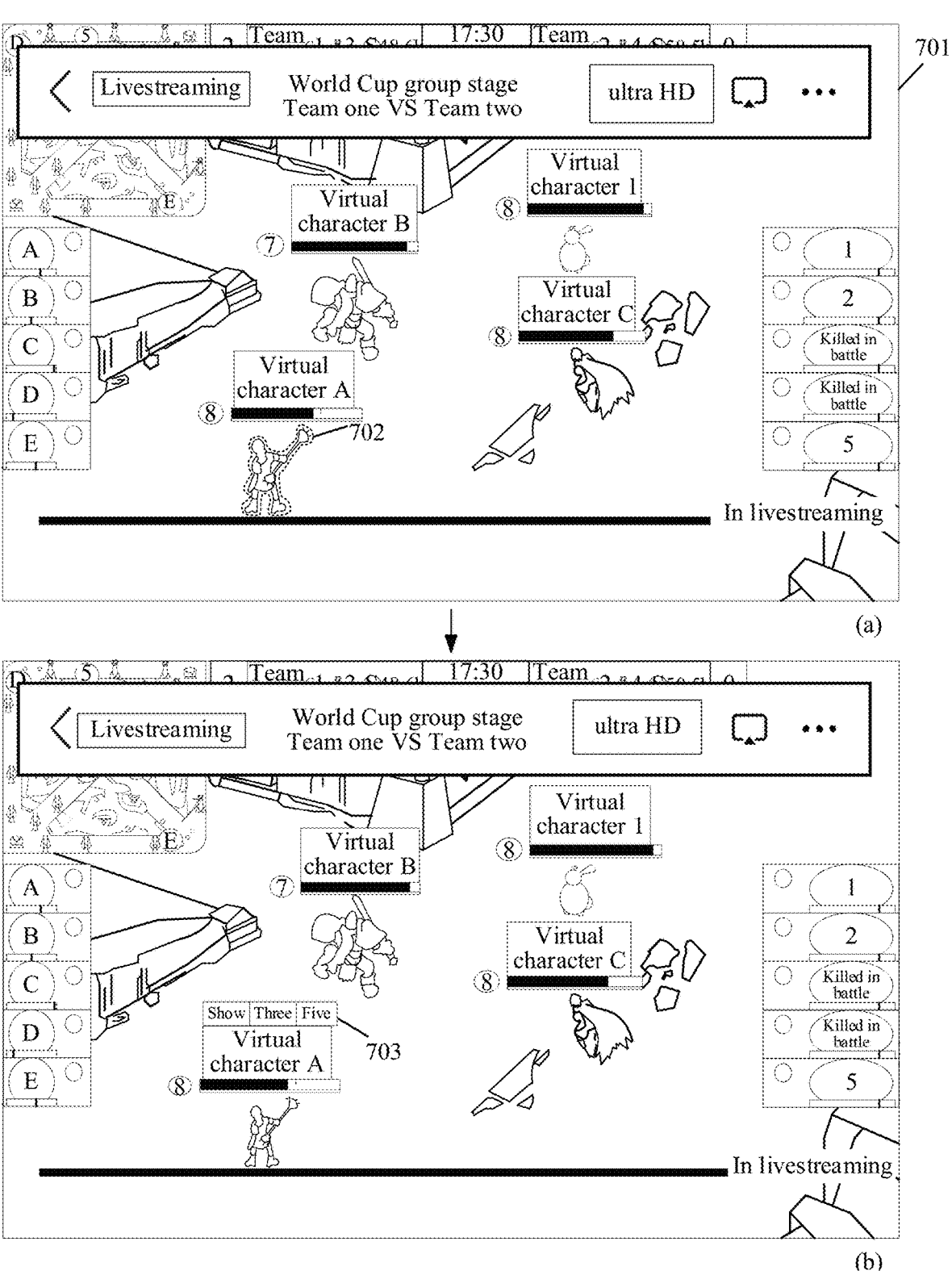
FIG. 7 is a schematic diagram of a target virtual character provided by an exemplary embodiment of the present disclosure.

Exemplarily, FIG. 7 is a schematic diagram of a target virtual character provided by an exemplary embodiment of the present disclosure. As shown in (a) of FIG. 7, the virtual environment is displayed in the livestreaming interface 701, and the target virtual character 702 exists in the virtual environment. The client may display a dashed outline border for the target virtual character 702. As shown in (b) of FIG. 7, when the client receives a clicking operation for the target virtual character, three playback controls 703 may be displayed above the target virtual character 702. Each playback control 703 represents one target segment corresponding to the target virtual character 702. The playback control 703 is displayed as a square button, with different text displayed in the middle of the square button to reflect the different target segments corresponding to the target virtual character 702.

Fourth Display Mode:

In response to a playback list display operation, the client may display a playback list of the target segment in the livestreaming interface, and then display the playback control in the playback list. The list display operation is triggered through the list display control, or the list display operation is triggered through a gesture operation in the livestreaming interface. In some embodiments, the list display control is a button, displayed above or below the livestreaming interface. The gesture operation is an inward sliding operation from a leftmost side of the livestreaming interface, or an inward sliding operation from a rightmost side of the livestreaming interface. The playback list is displayed as a rectangular box, displayed on a left side or a right side of the livestreaming interface, or displayed as a pop-up window or a floating layer. In some embodiments, in response to that the event live stream includes the plurality of target segments, the client may display the plurality of playback controls in the playback list. Each playback control represents one candidate target segment. The content displayed by each playback control includes a name of the target segment, a name of a player corresponding to the target segment, an avatar of the player corresponding to the target segment, and a screenshot of the target segment. The client may acquire the above information through the server.

Figure 8:
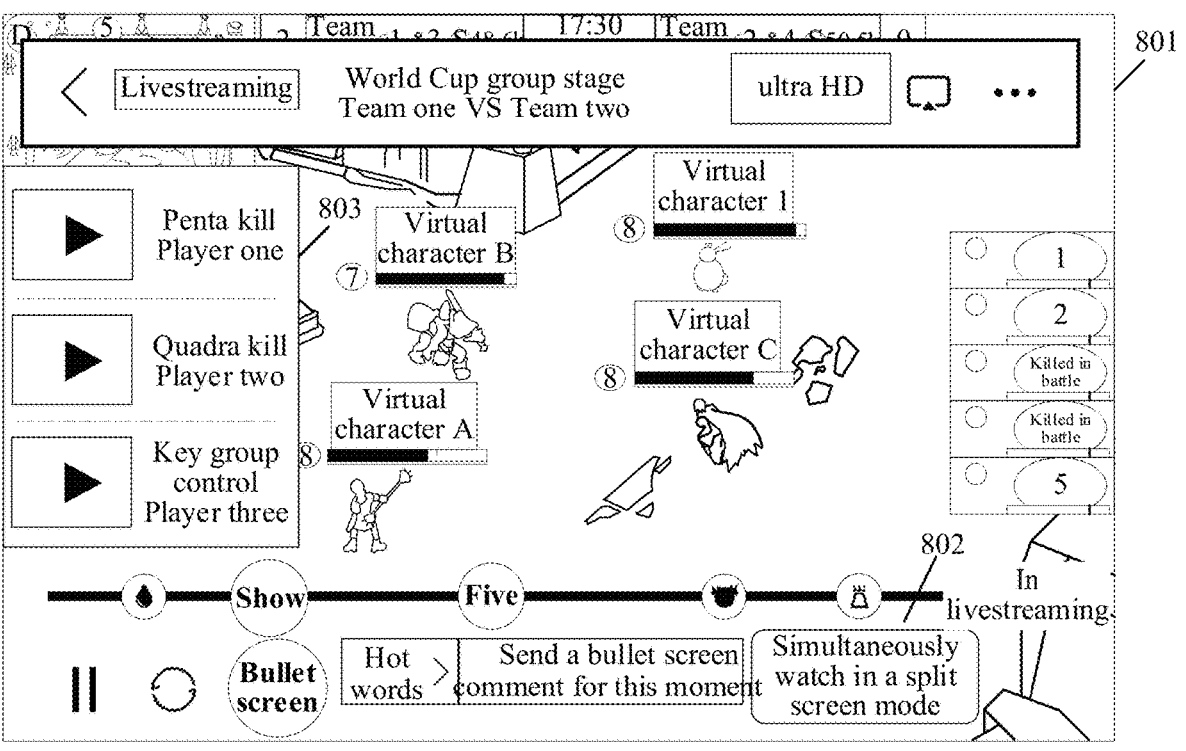
FIG. 8 is a schematic diagram of a playback list provided by an exemplary embodiment of the present disclosure.

Exemplarily, FIG. 8 is a schematic diagram of a playback list provided by an exemplary embodiment of the present disclosure. As shown in FIG. 8, a list display button 802 is displayed in the livestreaming interface 801. In response to the click operation for the list display button 802, the client may display the playback list 803 on the left side of the livestreaming interface 801. There are three playback controls displayed in the playback list 803. Each playback control represents one candidate target segment, and each playback control is a part of rectangular area in the playback list. The displayed content includes the name of the target segment, the name of the player corresponding to the target segment, and the screenshot of the target segment. When there are more than 3 target segments, the client can display the playback controls in the playback list 803 in a switch mode by the sliding operation for the playback list 803.

Fifth Display Mode:

A livestreaming bullet screen is displayed on the livestreaming image displayed on the client. For example, the livestreaming bullet screen is superimposed on the livestreaming screen and displayed in a movable mode. In response to that there is the target segment in the event live stream, the client may display a prompt bullet screen comment (may be regarded as the playback control) corresponding to the target segment in the livestreaming bullet screen. The prompt bullet screen comment is generated by the server and sent to the client, or generated by the client. This prompt bullet screen comment is used for indicating that there is the target segment in the event live stream. In response to that there are the plurality of target segments, each target segment corresponds to one prompt bullet screen comment. Bullet screen comments, except for the prompt bullet screen comment, in the livestreaming bullet screen are sent by users who watch the event live stream. The content of the prompt bullet screen comment is generated according to the content of the target segment, including at least one of information of the player corresponding to the target segment, information of a virtual object, the type of the content of the target segment, and preset prompt information. In some embodiments, when acquiring the target segment, the client may display the prompt bullet screen comment corresponding to the target segment, and then display the prompt bullet screen comment periodically according to a preset period. The preset periods for the different prompt bullet screen comments are the same or different, for example, a preset period for a target segment with more likes is smaller than a preset period for a target segment with fewer likes.

In response to a split screen display operation triggered by the prompt bullet screen comment, the client displays the livestreaming image in a first split screen area and displays a playback image of a target segment corresponding to the prompt bullet screen comment in a second split screen area. In some embodiments, the above split screen display operation is triggered by a touch operation for the prompt bullet screen comment. For example, it includes operations such as clicking, double clicking, multiple clicking, sliding, and long pressing on the prompt bullet screen comment. By triggering split screen display of the livestreaming image and the playback image of the target segment in the form of bullet screen comments, the user can be significantly prompted with the target segment without affecting a watching experience of the user, thereby improving the user experience.

Figure 9:
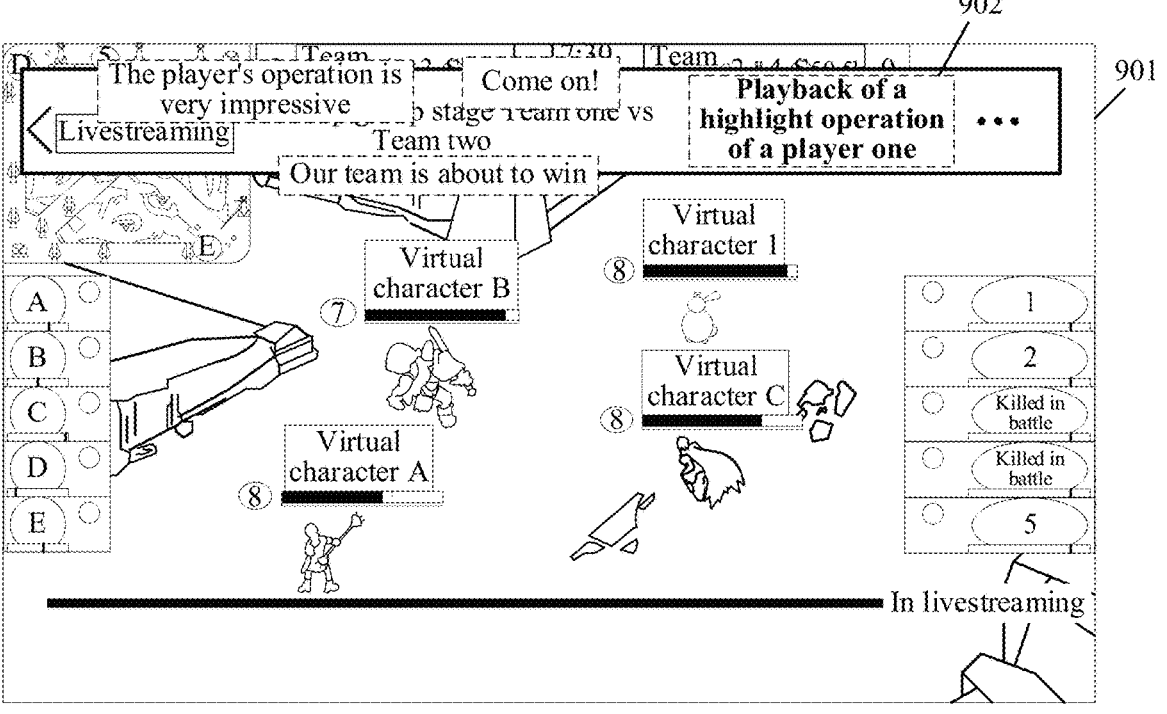
FIG. 9 is a schematic diagram of a bullet screen provided by an exemplary embodiment of the present disclosure.

Exemplarily, FIG. 9 is a schematic diagram of a prompt bullet screen comment provided by an exemplary embodiment of the present disclosure. As shown in FIG. 9, the livestreaming image of the event live stream is displayed in the livestreaming interface 901, and the livestreaming bullet screen is displayed on the livestreaming image. The livestreaming bullet screen includes a bullet screen comment sent by the user watching the event live stream and a prompt bullet screen comment 902. Each prompt bullet screen comment 902 represents one target segment of the event live stream. In response to a clicking operation for the prompt bullet screen comment 902, the client may be triggered to display the livestreaming image in the first split screen area and display a playback image of a target segment corresponding to the prompt bullet screen comment in the second split screen area. In some embodiments, the prompt bullet screen comment and the bullet screen comment sent by the user have different display modes, for example, including at least one of different fonts, different colors, and different thicknesses.

Sixth Display Mode:

In response to acquiring the target segment, the client may display the playback image (may be regarded as the playback control) of the target segment by using a small window at an edge of the livestreaming interface according to a preset duration. The preset duration is determined by the server or customized by the user. If there are the plurality of target segments, the client may display the playback image of the target segment in the small window (e.g., a picture-in-picture small window, a floating small window, an overlay small window, etc.) according to the time of acquiring the target segment and the preset duration. In some embodiments, the client further may display introduction information of the target segment near the small window. The small window is an area with a display size being less than a preset size in the livestreaming interface.

In response to the split screen display operation triggered by the playback image, the client displays the livestreaming image in the first split screen area and displays the playback image of the target segment in the second split screen area. In some embodiments, the above split screen display operation is triggered by a touch operation for the playback image displayed in the small window. For example, it includes operations such as clicking, double clicking, multiple clicking, sliding, and long pressing on the playback image. By displaying the playback image in the form of the small window with the preset duration, not only can the user preview the playback image, but also can avoid obstructing the user from watching other content on the livestreaming interface. The user may trigger split screen display of a clearer playback image as needed, which may improve the user experience.

Figure 10:
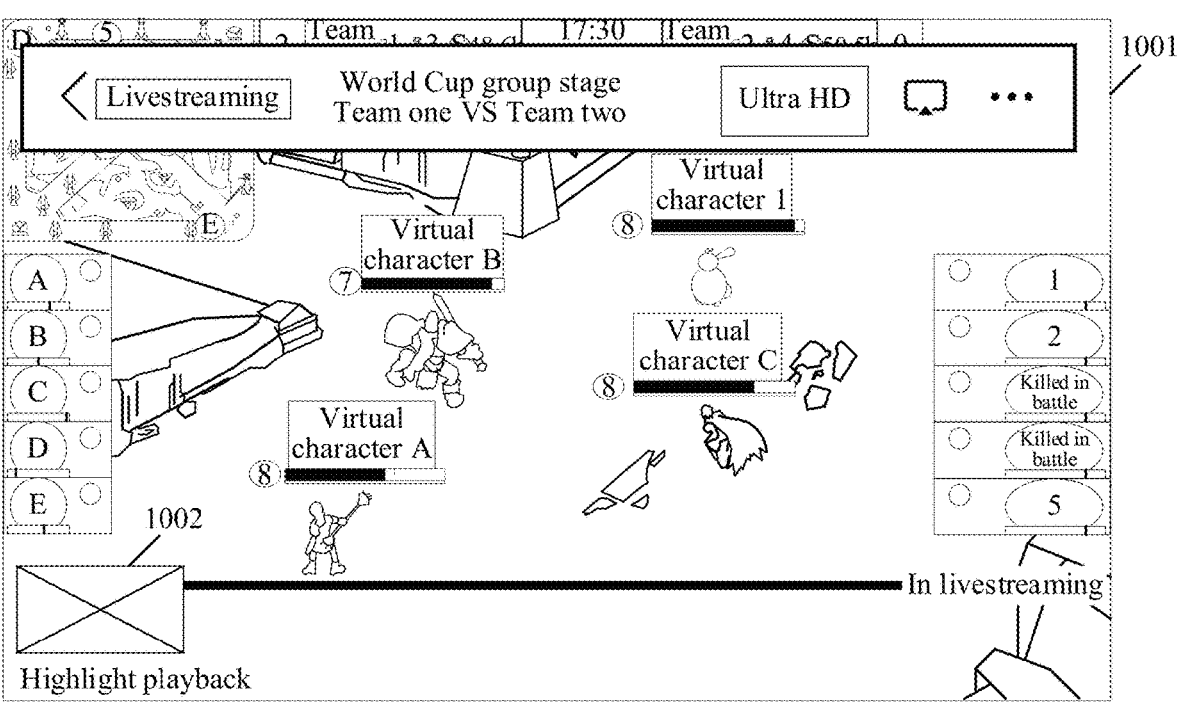
FIG. 10 is a schematic diagram of displaying a playback image through a small window provided by an exemplary embodiment of the present disclosure.

Exemplarily, FIG. 10 is a schematic diagram of displaying a playback image through a small window provided by an exemplary embodiment of the present disclosure. As shown in FIG. 10, when the client acquires the target segment of the event live stream, the client may display the playback image 1002 of the target segment in a mode of the small window in the lower right corner of the livestreaming interface 1001, and cancel the display after 5 seconds. During this period, if the client receives the clicking operation for the playback image 1002 displayed in the small window, the client may display the livestreaming image in the first split screen area and display the playback image of the target segment in the second split screen area.

Seventh Display Mode:

The livestreaming image displayed by the client displays an avatar of the virtual character controlled by the player participating in the event. For example, if there are two teams participating in the event, each team has five players, and each player controls one virtual character, the client displays the respective avatars of ten virtual characters in the livestreaming image. In response to a list display operation triggered by an avatar of the target virtual character, the client may display a playback list of the target segment corresponding to the target virtual character, the playback control of the target segment corresponding to the target virtual character is displayed in the playback list, and if there are the plurality of target segments, one playback control may be displayed for each target segment. The target segment is generated based on the behavior of the target virtual character. In some embodiments, the above list display operation is triggered by a touch operation for the avatar of the target virtual character in the virtual character. For example, it includes operations such as clicking, double clicking, multiple clicking, sliding, and long pressing on the avatar of the target virtual character.

In response to a split screen display operation triggered by the playback control corresponding to the target virtual character, the client may display the livestreaming image in the first split screen area and displays the playback image of the target segment corresponding to the target virtual character (the playback control) in the second split screen area. By triggering the display of the playback list of the virtual character through the avatar of the virtual character, the target segment of the virtual character is displayed, so that the user may select a virtual character by himself/herself to participate in the competition and watch the target segment according to the needs of the user, thereby improving the user experience.

Figure 11:
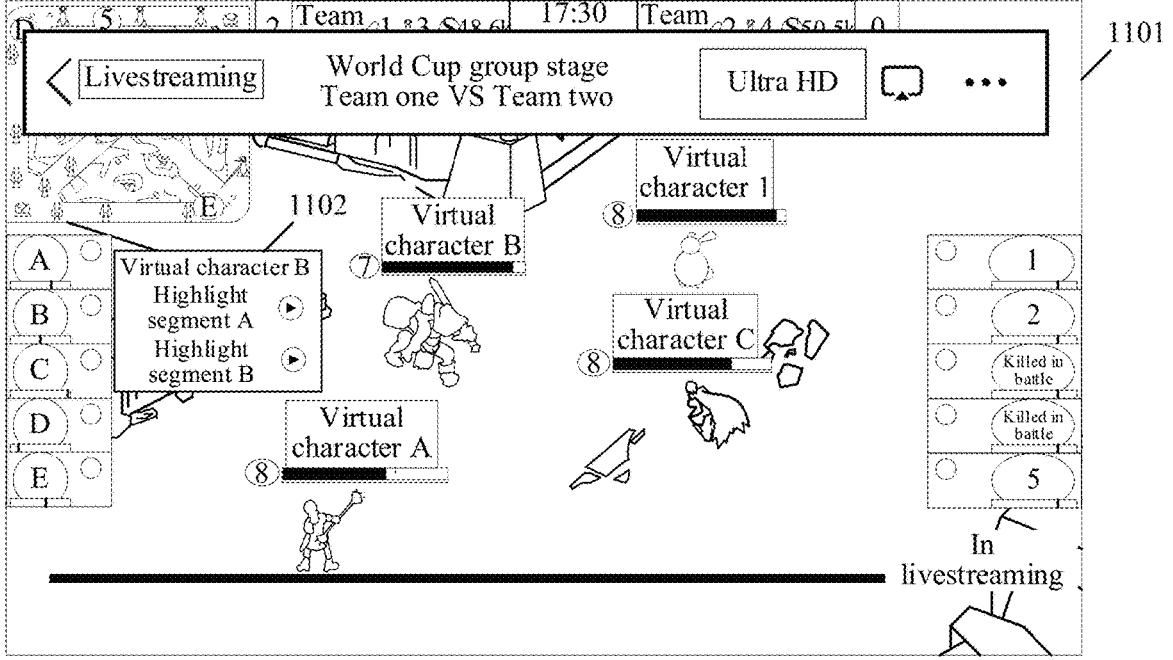
FIG. 11 is a schematic diagram of a playback control of a virtual character provided by an exemplary embodiment of the present disclosure.

Exemplarily, FIG. 11 is a schematic diagram of a playback control of a virtual character provided by an exemplary embodiment of the present disclosure. As shown in FIG. 11, when the client receives a clicking operation for an avatar of the virtual character B displayed, the client may display a playback list 1102 of highlight/target segments corresponding to the virtual character B in the livestreaming interface 1101. The playback list 1102 includes the respective playback controls for the two target segments corresponding to the virtual character B. In response to a split screen display operation triggered by the playback control corresponding to the virtual character B, the client may display the livestreaming image in the first split screen area and display the playback image of the target segment corresponding to the playback control in the second split screen area.

The client can display the playback control by using any of the above display modes, or display the playback control by simultaneously using the plurality of display modes in the above mode. That is, the different display modes above can be freely combined and used, which is not limited in this embodiment of the present disclosure. In addition, the client can further display the playback control through other display modes. The above display modes are only used as examples and do not limit the mode for displaying the playback control in this embodiment of the present disclosure.

Step 408: Display, in response to the split screen display operation triggered based on the playback control, the livestreaming image in the first split screen area and display the playback image of the target segment in the second split screen area.

The first split screen area and the second split screen area are different display areas in the livestreaming interface. The livestreaming image is displayed by the client by playing the event live stream acquired in real time. The playback image is displayed by the client by playing video resources of the target segment. The event live stream and the video resources of the target segment are played simultaneously. The video resources of the target segment are acquired by the client through the server.

In some embodiments, when displaying the livestreaming image and the target segment in a split screen mode, the client may determine a display ratio of the second split screen area in the livestreaming interface according to the type of the content of the target segment, and then display the livestreaming image and the target segment according to the determined display ratio. For example, if the type of the content of the target segment is "First blood" in Table 1, the required display range is small, and a display ratio of 1:1 may be used. If the type of the content of the target segment is "Penta kill" in Table 1, the required display range is large, and a display ratio of 16:9 may be used.

Figure 12:
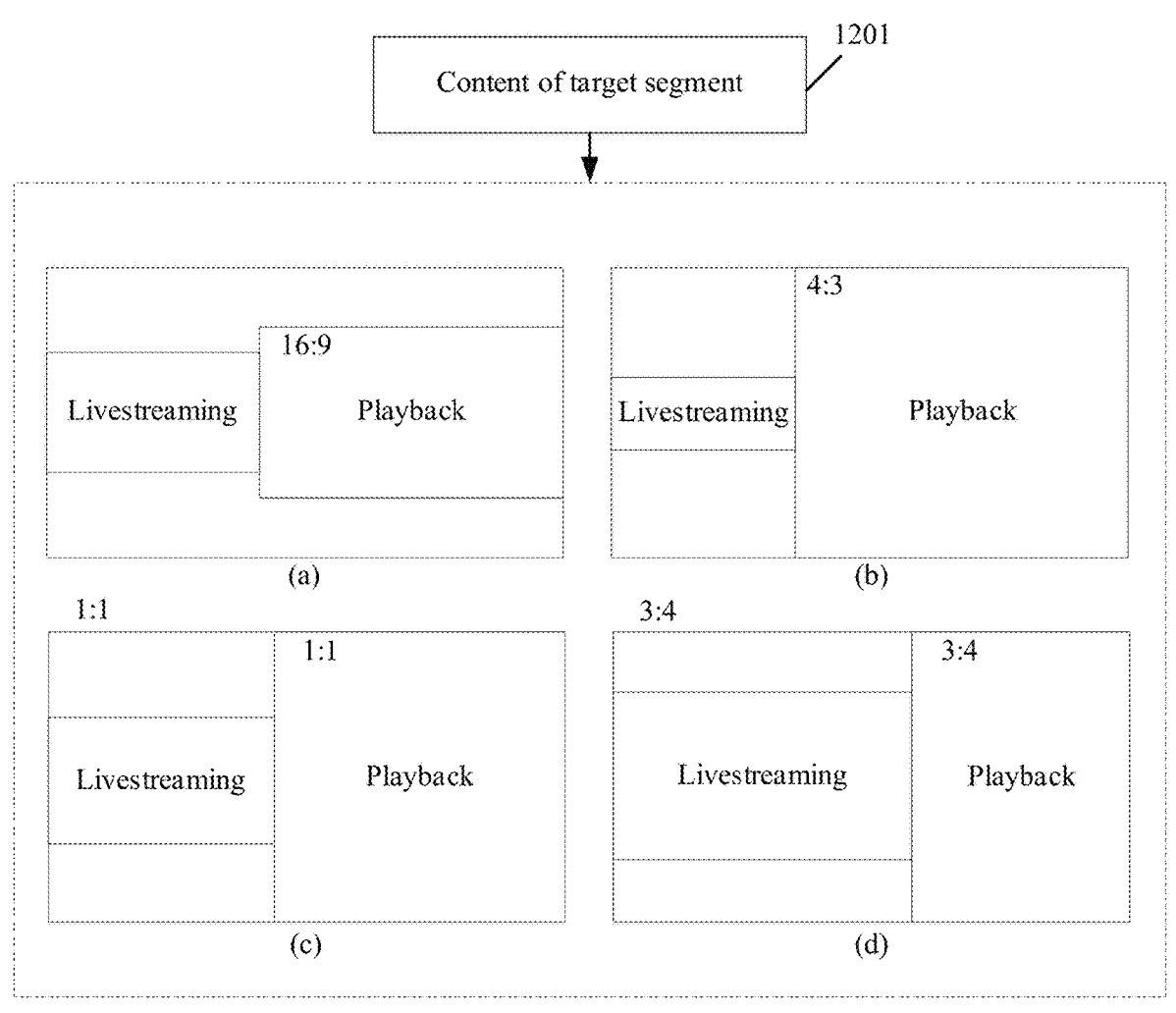
FIG. 12 is a schematic diagram of a display ratio of a second split screen area in a livestreaming interface provided by an exemplary embodiment of the present disclosure.

Exemplarily, FIG. 12 is a schematic diagram of a display ratio of a second split screen area in a livestreaming interface provided by an exemplary embodiment of the present disclosure. As shown in FIG. 12, when it is necessary to display the livestreaming image and the playback image in a split screen mode, the client may determine the display ratio of the second split screen area in the livestreaming interface according to the type 1201 of the content of the target segment. For example, in (a) of FIG. 12, the display ratio of the second split screen area is 16:9. In (b) of FIG. 12, the display ratio of the second split screen area is 4:3. In (c) of FIG. 12, the display ratio of the second split screen area is 1:1. In (d) of FIG. 12, the display ratio of the second split screen area is 3:4. When determining the display ratio of the second split screen area, the client may further determine display locations and display areas of the second split screen area and the first split screen area.

In some embodiments, when there are the plurality of target segments included, the client can further use more split screen areas to display the livestreaming image and the playback image. For example, the first split screen area is used to display the livestreaming image, the second split screen area is used to display a first playback image, and the third split screen area is used to display a second playback image. The first playback image and the second playback image are images obtained by playing different target segments.

The playback control can directly trigger the split screen display operation. For example, in response to the split screen display operation triggered by the playback control, the client can directly display the livestreaming image and the playback image in a split screen mode. Or, the playback control can trigger a detail display operation, and in response to the detail display operation triggered by the playback control, the client may display the detail introduction control corresponding to the target segment in the livestreaming interface. In response to a split screen display operation triggered by the detail introduction control, the client may display the livestreaming image in the first split screen area and display the playback image in the second split screen area. In some embodiments, in response to that the playback control is displayed in the progress bar, the playback control can trigger the above detail display operation. The detail introduction control is displayed as a rectangular pop-up window. Information for introducing the target segment corresponding to the playback control is displayed in the detail introduction control. The information for introducing the target segment includes a name of the target segment, a name of a player corresponding to the target segment, an avatar of the player corresponding to the target segment, and a screenshot of the target segment. The client may acquire the above information through the server. In some embodiments, a detail introduction button is displayed in the detail introduction control, and the detail introduction button is used for triggering the split screen display operation. The above triggering the operation through the control refers to triggering the operation by clicking, double clicking, multiple clicking, sliding, long pressing on the control.

In some embodiments, in response to that the playback control corresponds to one target segment, that is, the playback control represents one target segment, the client displays the playback image of the target segment corresponding to the playback control. In response to that the playback control corresponds to the plurality of target segments, that is, the playback control represents the plurality of target segments, the client may display a playback image of the target segment closest to the current time, or display a playback image of the target segment farthest from the current time, or display a playback image of a target segment with the most likes, or randomly select one from the plurality of target segments to display its playback image.

Exemplarily, continuing to refer to FIG. 2, when receiving the clicking operation for the playback control in the progress bar, the client may receive the detail display operation and display the detail introduction control above the playback control. When receiving a clicking operation for "simultaneously watching in a split screen mode" in the detail introduction control, the split screen display operation is received, so as to display the livestreaming image and the playback image in a split screen mode.

In some embodiments, the client can further trigger the split screen display operation through other modes without displaying the playback control. For example, in response to that a gesture operation in the livestreaming interface meets a trajectory condition, the client may display the livestreaming image in the first split screen area and display the playback image in the second split screen area. The trajectory condition is set for a sliding trajectory of the gesture operation. For example, the trajectory condition includes a sliding trajectory to form a preset shape, and the sliding trajectory is a trajectory of sliding from an outer side of the livestreaming interface to an inner side of the livestreaming interface, such as a trajectory of sliding inwards from a left side or a trajectory of sliding inwards from a right side.

Figure 13:
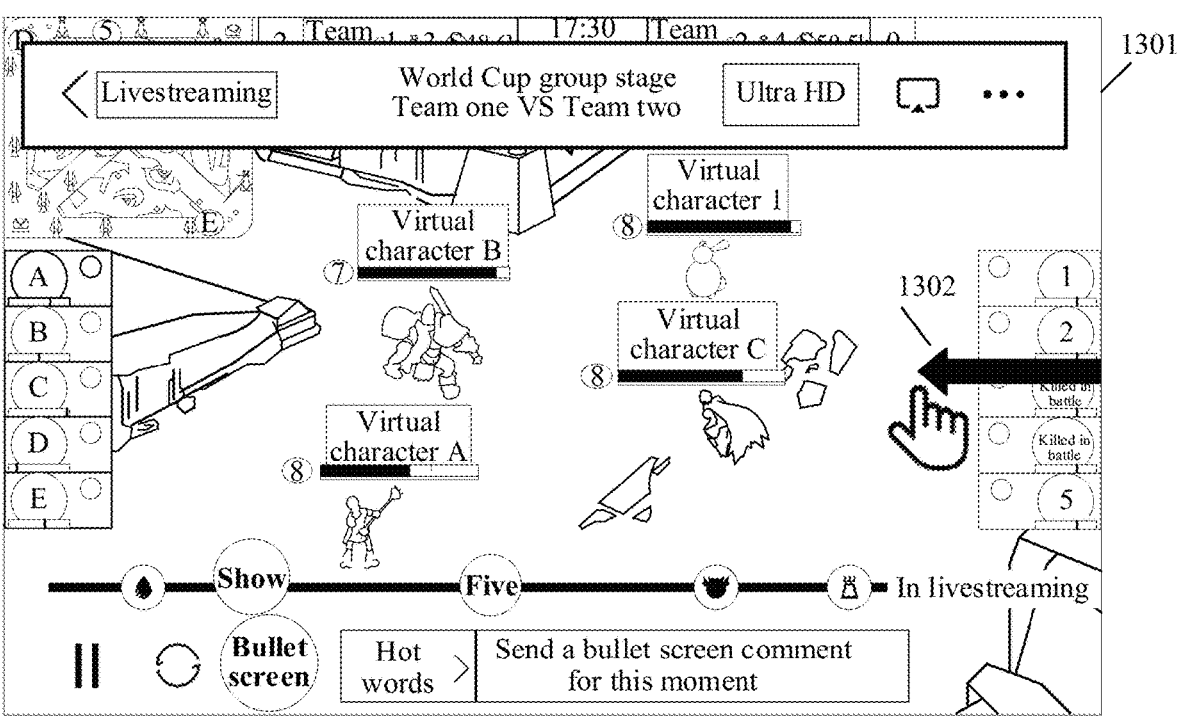
FIG. 13 is a schematic diagram of a gesture operation provided by an exemplary embodiment of the present disclosure.

Exemplarily, FIG. 13 is a schematic diagram of a gesture operation provided by an exemplary embodiment of the present disclosure. As shown in FIG. 13, the client displays the livestreaming interface 1301. When receiving the sliding operation 1302 of sliding inwards from the left side in the livestreaming interface 1301, the client may trigger the split screen display operation, thereby displaying the livestreaming image in the first split screen area and the playback image in the second split screen area.

In addition, in response to that the event live stream includes the plurality of target segments and in response to a switching operation for the playback image, the client can display the playback image of the target segment of the event live stream in a switch mode according to a time sequence. The switch operation includes a sliding operation for the displayed playback image, such as up sliding, down sliding, left sliding and right sliding. If the displayed playback image of the target segment is achieved through the playback control of the second display form or third display form above, the client may only switch within a range of the target segment corresponding to the target virtual character when switching the target virtual character.

Figure 14:
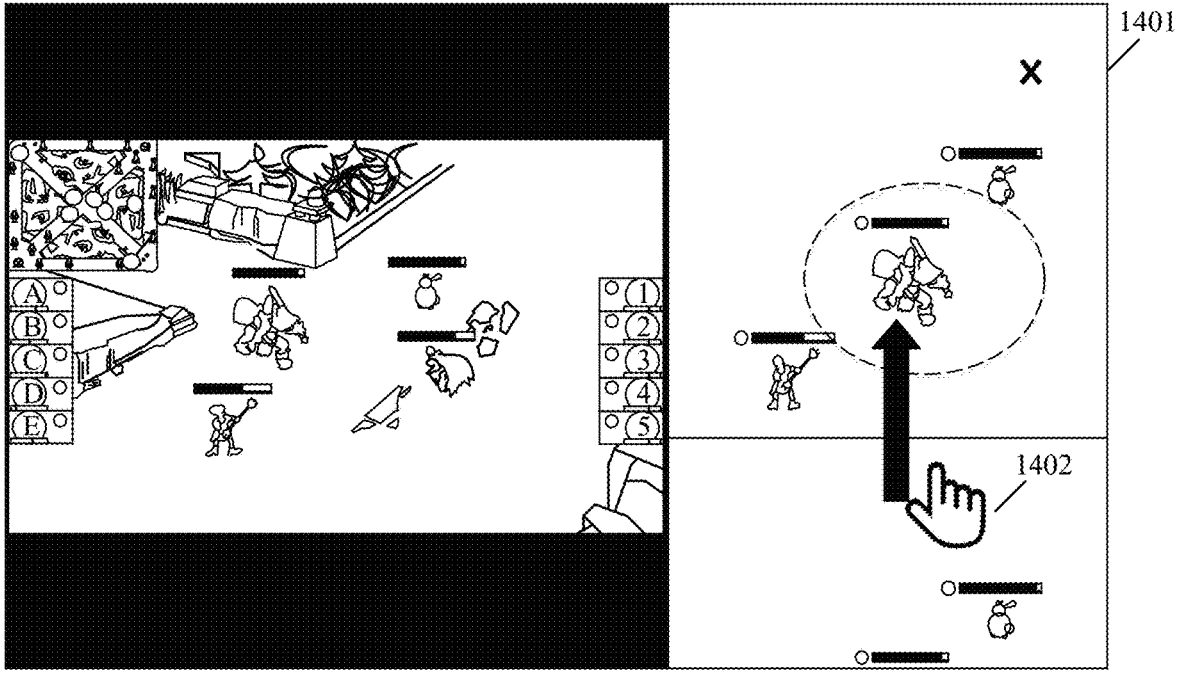
FIG. 14 is a schematic diagram of a switching operation provided by an exemplary embodiment of the present disclosure.

Exemplarily, FIG. 14 is a schematic diagram of a switching operation provided by an exemplary embodiment of the present disclosure. As shown in FIG. 14, the client displays the playback image 1401 of the target segment in the livestreaming interface. When the client receives an up sliding operation 1402 for the playback image 1401, the client may display a playback image of a target segment located after the target segment in a time sequence in a switch mode.

The client can cancel split screen display and restore full screen display of the livestreaming image according to a close operation of the playback image. While displaying the playback image of the target segment in the second split screen area, the client may further display an interactive control in the second split screen area, so that the user can interact for the target segment. This interactive control is displayed as a button.

Figure 15:
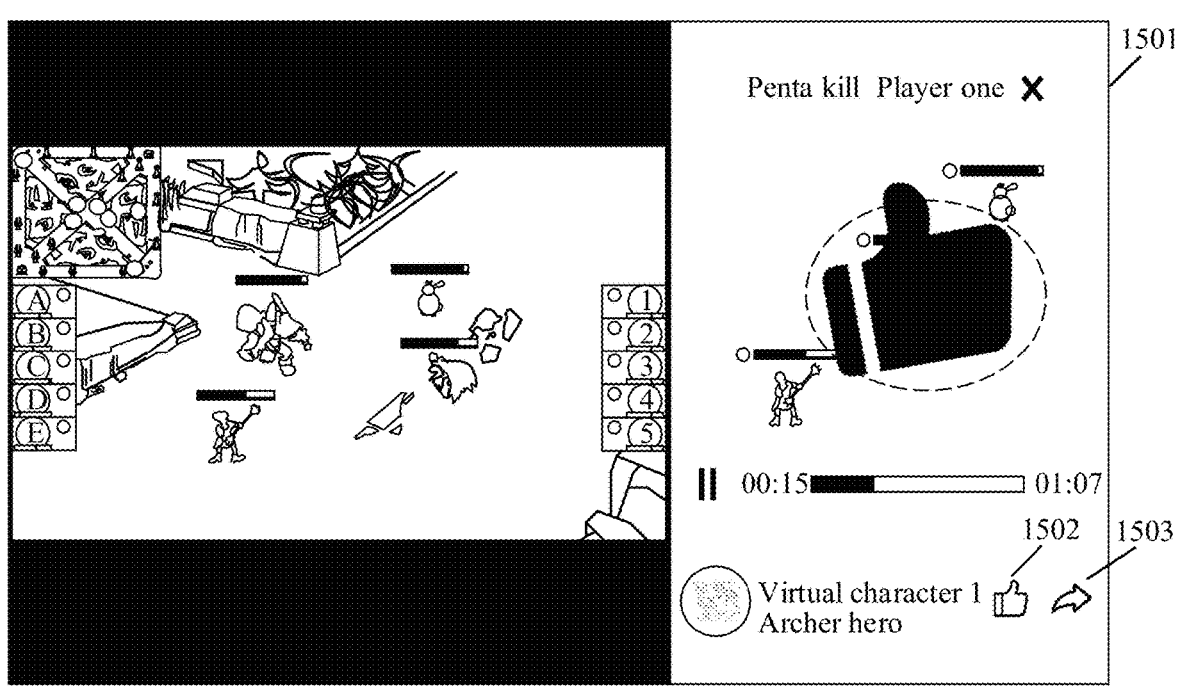
FIG. 15 is a schematic diagram of a second split screen area provided by an exemplary embodiment of the present disclosure.

Exemplarily, FIG. 15 is a schematic diagram of a second split screen area provided by an exemplary embodiment of the present disclosure. As shown in FIG. 15, the playback image of the target segment, as well as a like button 1502 and a share button 1503 are displayed in the second split screen area 1501. When the client receives a clicking operation for the like button 1502, a like icon may be displayed in a center of the second split screen area 1501.

Figure 16:
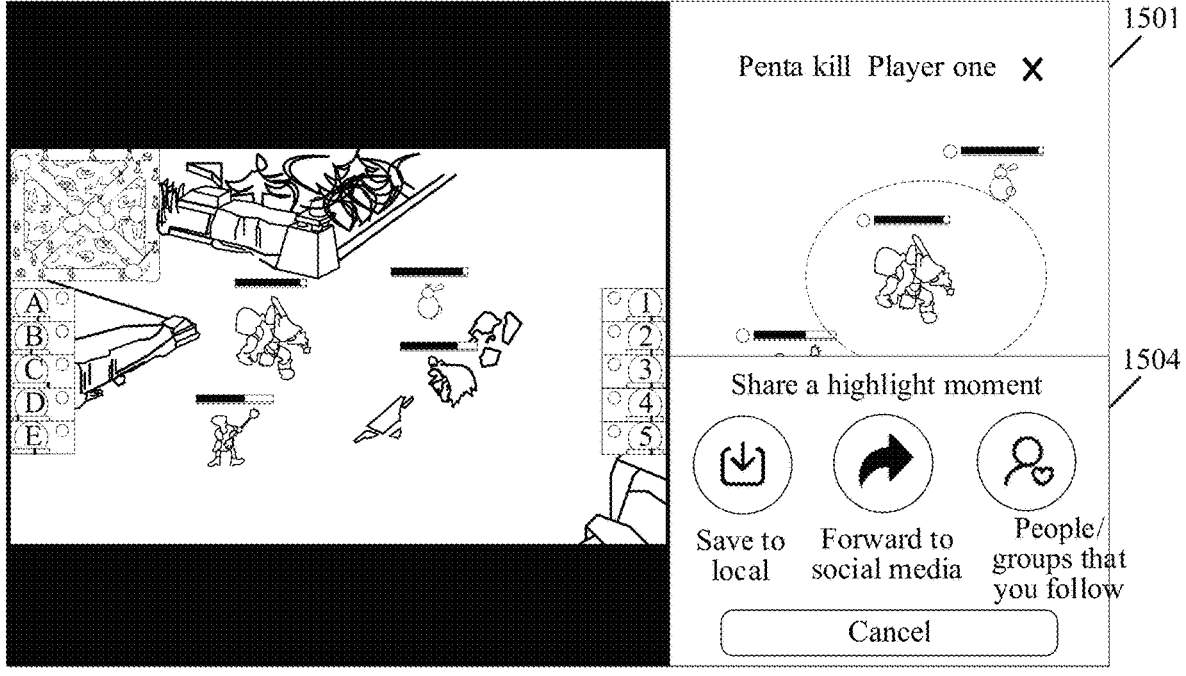
FIG. 16 is a schematic diagram of a second split screen area provided by an exemplary embodiment of the present disclosure.

Exemplarily, FIG. 16 is a schematic diagram of a second split screen area provided by an exemplary embodiment of the present disclosure. As shown in FIG. 16 and FIG. 15, when the client receives a clicking operation for the share button 1503, the client may display a pop-up window 1504 in the second split screen area 1501. A button for downloading the target segment, a button for forwarding the target segment, a button for sharing the target segment with following users/groups, and a button for canceling the display of the pop-up window 1504 are displayed in the pop-up window 1504.

Figure 17:
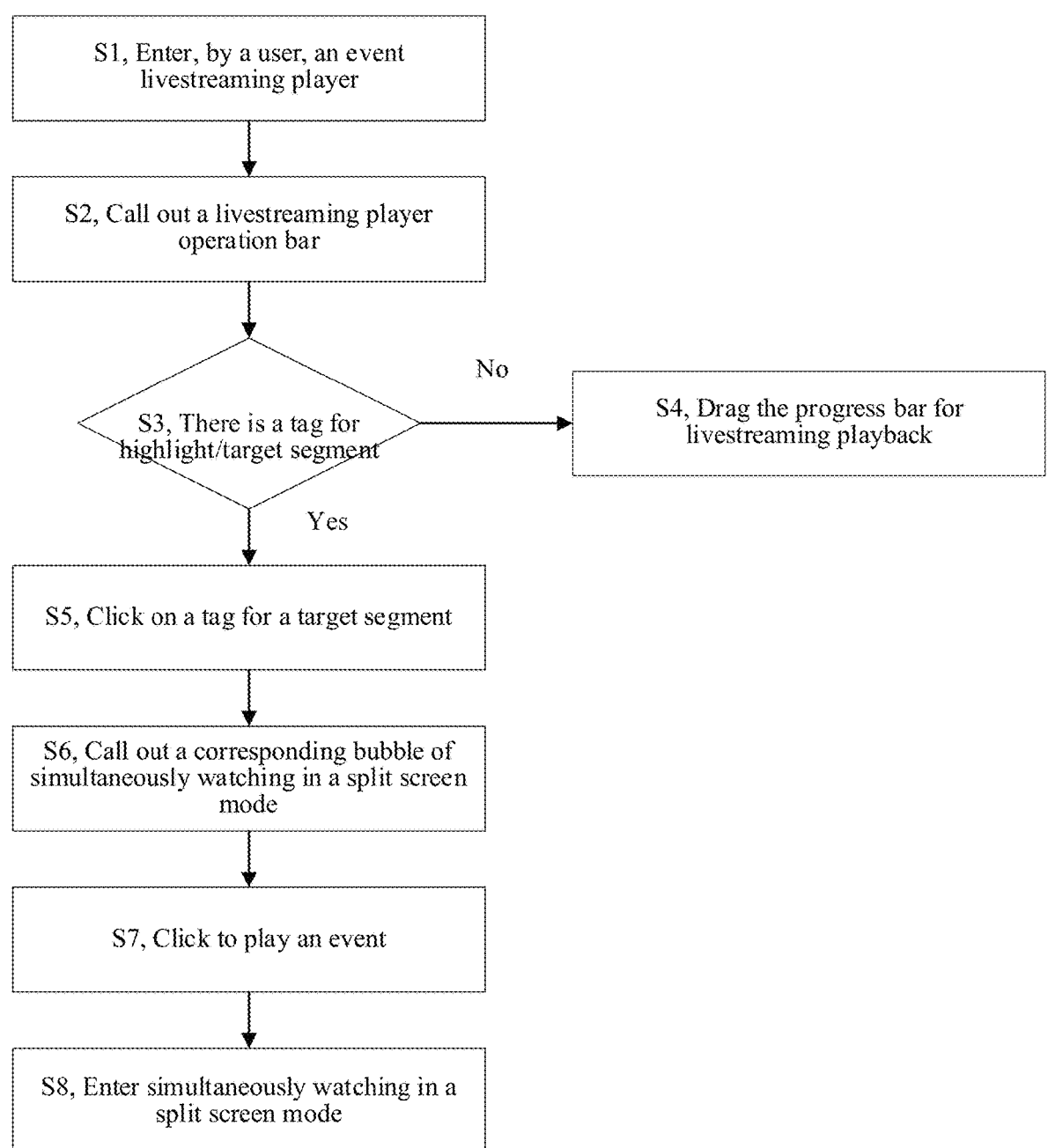
FIG. 17 is a schematic flowchart of a front-end interaction process provided by an exemplary embodiment of the present disclosure.

In a specific example, the interactive process of the method provided by this embodiment of the present disclosure is introduced by taking an example that the playback control is displayed in the progress bar, and the playback control can trigger the display of the detail introduction control. FIG. 17 is a schematic flowchart of a front-end interaction process provided by an exemplary embodiment of the present disclosure. As shown in FIG. 17, in step S1, the client displays the live streaming interface according to an operation of the user, and displays the livestreaming image of the event live stream on the livestreaming interface. In step S2, the client displays the progress bar in the livestreaming interface according to the operation of the user. In step S3, the client judges whether there is the target segment in the event live stream. In step S4, in response to that there is no target segment in the event live stream, the user may play back the event live stream by dragging the progress bar. In step S5, in response to that there is the target segment in the event live stream, the client may display the playback control (a highlight event tag) in the progress bar and receives an operation of clicking the playback control by the user. In step S6, the client displays the detail introduction control (a bubble of simultaneously watching in a split screen mode) in the livestreaming interface. In step S7, the client receives a click operation of the user for a button of simultaneously watching in a split screen mode in the detail introduction control. In step S8, the client displays the livestreaming image of the event live stream and the playback image of the target segment in the livestreaming interface in a split screen mode.

Figure 18:
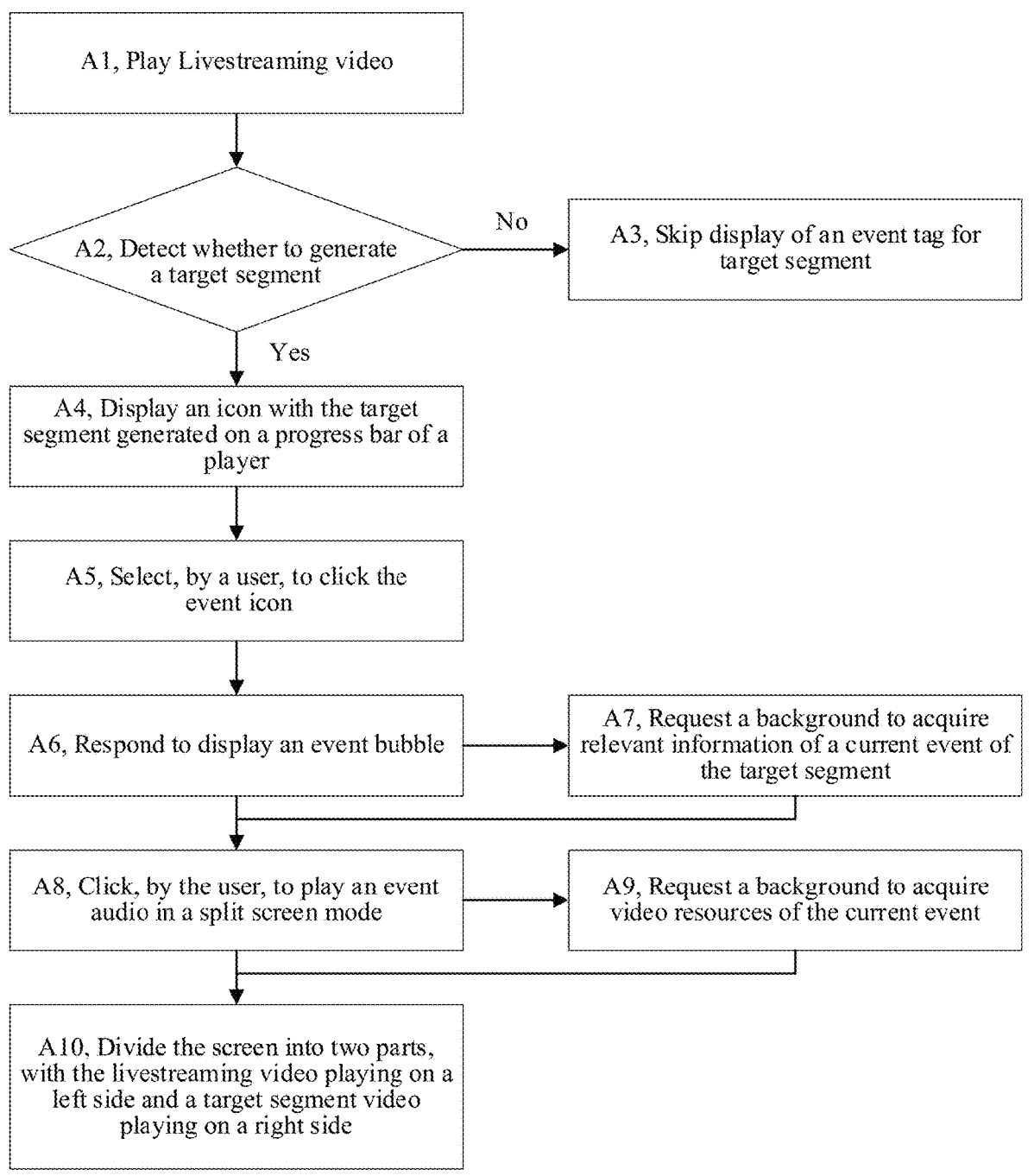
FIG. 18 is a schematic flowchart of realizing split screen display provided by an exemplary embodiment of the present disclosure.

In a specific example, the implementation process of the method provided by this embodiment of the present disclosure is introduced. FIG. 18 is a schematic flowchart of realizing split screen display provided by an exemplary embodiment of the present disclosure. As shown in FIG. 18, in step A1, the client plays the event live stream through the livestreaming interface. In step A2, the client detects whether there is the target segment in the event live stream. In step A3, in response to that there is no target segment in the event live stream, the client may not display the playback control in the progress bar. In step A4, in response to that there is the target segment in the event live stream, the client may display the playback control (an icon of a highlight event) in the progress bar. In step A5, the client receives a click operation of the user for the playback control. In step A6, the client displays the detail introduction control (an event bubble) in the livestreaming interface. In step A7, the client acquires information for introducing the target segment through the server to display the information for introducing the target segment in the detail introduction control. In step A8, the client receives the click operation of the user for the displayed button of simultaneously watching in a split screen mode in the detail introduction control. In step A9, the client acquires video resources of the target segment through the server. In step A10, the client divides the livestreaming interface into two split screen display areas, displays the livestreaming image of the event live stream in a left-side area, and displays the playback image of the target segment in a right-side area.

Figure 19:
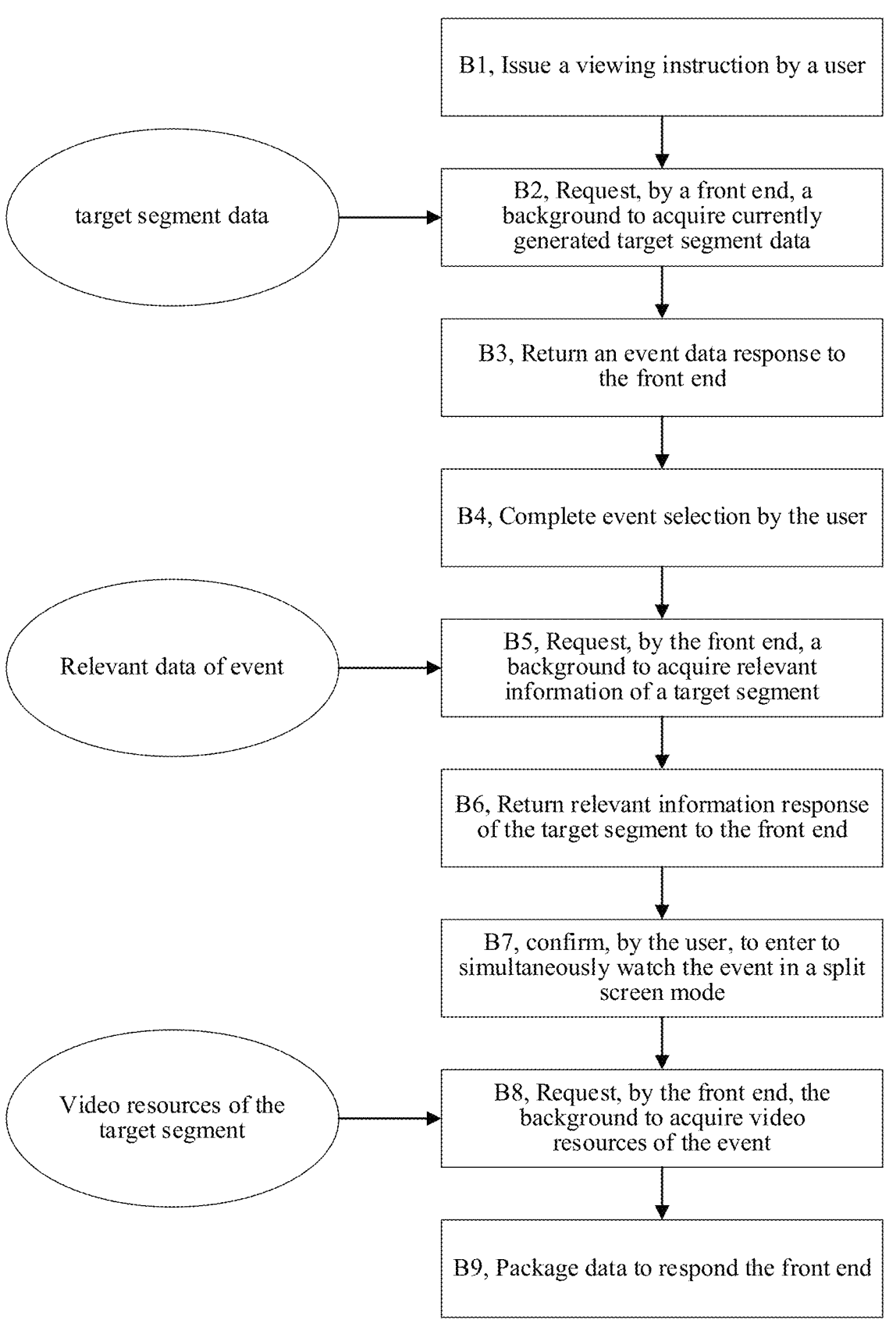
FIG. 19 is a schematic flowchart diagram of acquiring relevant data of split screen display provided by an exemplary embodiment of the present disclosure.

Exemplarily, FIG. 19 is a schematic flowchart diagram of acquiring relevant data of split screen display provided by an exemplary embodiment of the present disclosure. As shown in FIG. 19, in step B1, the client receives an instruction sent by the user to view the event live stream, displays the livestreaming interface, and plays the event live stream. In step B2, the client requests a detection result for whether there is the target segment in the event live stream from the server. In step B3, the client acquires the detection result of the server for whether there is the target segment in the event live stream, and displays the playback control in the progress bar of the livestreaming interface. In step B4, the client receives a click operation of the user for the playback control. In step B5, the client requests information for introducing the target segment corresponding to the playback control from the server. In step B6, the client acquires the information, sent by the server, for introducing the target segment corresponding to the playback control. In step B7, the client displays the detail introduction control in the livestreaming interface, and displays the information for introducing the target segment corresponding to the playback control in the detail introduction control. Then, the client receives the click operation of the user for the button of simultaneously watching in a split screen mode in the detail introduction control. In step B8, the client requests video resources of the target segment from the server. In step B9, the client receives the video resources sent by the server, and displays the livestreaming image of the event live stream and the playback image of the target segment in the livestreaming interface in a split screen mode.

To sum up, according to the method provided by this embodiment, by displaying the playback control corresponding to the target segment of the event live stream in the livestreaming interface, and according to the split screen display operation triggered based on the playback control, split screen display of the livestreaming image of the event live stream and the playback image of the target segment can be achieved, so that the user can simultaneously watch the event livestreaming and play back the target segment. When playing back the target segment through the above mode, the user can simultaneously watch the event livestreaming without any operation, thereby simplifying an operation of the user of returning to watch the event livestreaming during the playback of the target segment.

In addition, the playback image of the target segment corresponding to the playback control is displayed through the playback control, so that a pre-edited target segment can be played according to the operation of the user. The user is prevented from dragging the progress bar repeatedly to find the target segment, which can improve the efficiency of the user in finding the target segment.

According to the method provided by this embodiment, by further displaying the playback control at the target progress location of the progress bar, visual display of the playback control is realized, and the playback progress of the target segment in the event live stream is indicated, which is conducive to finding the target segment by the user, and improving the efficiency of finding the target segment.

According to the method provided by this embodiment, the playback controls are further displayed in different display forms, so as to indicate the type of the content of the target segment corresponding to the playback control through the display form of the playback control, so that the user can visually distinguish the differences in the content of the different target segments, which is conducive to finding the target segment by the user, and improving the efficiency of finding the target segment.

According to the method provided by this embodiment, a misoperation when a user with a terminal having a small screen clicks the playback controls may further be avoided by making the distance between two adjacent playback controls displayed in the progress bar not less than the distance threshold, thereby improving the user experience.

According to the method provided by this embodiment, by further displaying the playback control on the periphery of the target virtual character, visual display of the playback control is realized, and the virtual character corresponding to the target segment is indicated, which is conducive to finding the target segment by the user, and improving the efficiency of finding the target segment.

According to the method provided by this embodiment, by further displaying the highlighting mark on the target virtual character, the virtual character corresponding to the target segment is indicated, thereby improving the efficiency of finding the target segment by the user. The playback control is displayed based on the control display operation triggered by the target virtual character, so that direct playback of the target segment caused by the user misoperation can be avoided, thereby improving the user experience.

According to the method provided by this embodiment, by further displaying the playback list and displaying the playback control in the playback list, the playback controls of the plurality of target segments can be simultaneously displayed, which facilitates the user to select the target segment for playback according to their own preferences and improves the user experience.

According to the method provided by this embodiment, by further triggering split screen display of the livestreaming image and the playback image of the target segment in the form of bullet screen comments, the user can be significantly prompted with the target segment without affecting a watching experience of the user, thereby improving the user experience.

According to the method provided by this embodiment, by further displaying the playback image in the form of the small window with the preset duration, not only can the user preview the playback image, but also can avoid obstructing the user from watching other content on the livestreaming interface. The user may trigger split screen display of a clearer playback image as needed, which may improve the user experience.

According to the method provided by this embodiment, by further triggering the display of the playback list of the virtual character through the avatar of the virtual character, the target segment of the virtual character is displayed, so that the user may select the virtual character by himself/herself to participate in the competition and watch the target segment according to the needs of the user, thereby improving the user experience.

According to the method provided by this embodiment, by further displaying the detail introduction control based on the playback control and displaying the information for introducing the target segment through the detail introduction control, so that the user quickly understands the content of the selected target segment, which is conducive to finding the target segment by the user, and improving the efficiency of finding the target segment.

According to the method provided in this embodiment, by further triggering split screen display of the target segment and the event live stream through the gesture operation, an operation mode for quick watching playback of the target segment is provided.

According to the method provided in this embodiment, by further setting different display ratios of the second split screen area for the target segments with different content types, so that the best display ratio can be used for displaying during split screen display of the target segment, thereby improving the experience of watching the target segment of the user.

According to the method provided in this embodiment, by further supporting switch of the displayed playback image of the target segment based on the switching operation, the user can conveniently switch and view the different target segments when watching the target segments.

The sequence of the method steps provided by the embodiments of the present disclosure may be adjusted appropriately, and the steps may also be increased or decreased accordingly according to the situation. The methods that any technical personnel familiar with the technical field may easily think of changing within the technical scope disclosed in the present disclosure are to be covered by the protection scope of the present disclosure, which will not be repeated here.

FIG. 20 is a schematic structural diagram of a display apparatus for event livestreaming provided by an exemplary embodiment of the present disclosure. As shown in FIG. 20, the apparatus includes:

a display module 2001, configured to display a livestreaming image of an event live stream in a livestreaming interface, the event live stream being a livestreaming stream of an event in which one or more virtual characters play in a virtual environment.

The display module 2001 is further configured to display a playback control corresponding to target segment in the livestreaming interface, the target segment being historical segments in the event live stream.

The display module 2001 is further configured to display, in response to a split screen display operation triggered based on the playback control, the livestreaming image in a first split screen area and display a playback image of the target segment in a second split screen area, the first split screen area and the second split screen area being different display areas in the livestreaming interface, and the first split screen area and the second split screen area having no intersection.

In one embodiment, the display module 2001 is configured to:

display a progress bar in the livestreaming interface; and display the playback control at a target progress location of the progress bar, the target progress location indicating a corresponding playback progress of the target segment in the event live stream.

In one embodiment, the playback control corresponds to a plurality of display forms. The display module 2001 is configured to:

display a playback control of a target form at the target progress location of the progress bar, the target form being a display form corresponding to a type of content of the target segment among the display forms of the playback control.

In one embodiment, as shown in FIG. 21, the apparatus further includes:

a determining module 2002, configured to determine the type of the content of the target segment through at least one model of a first machine learning model, a second machine learning model, a third machine learning model, and a fourth machine learning model, the first machine learning model predicting the type of the content of the target segment by identifying the playback image of the target segment, and the first machine learning model being obtained by training playback images of sample segments and types of contents of the sample segments; the second machine learning model predicting the type of the content of the target segment by identifying audio of the target segment, and the second machine learning model being obtained by training audios of the sample segments and the types of contents of the sample segments; the third machine learning model predicting the type of the content of the target segment by identifying commentary audio corresponding to the target segment, and the third machine learning model being obtained by training commentary audios corresponding to the sample segments and the types of contents of the sample segments; and the fourth machine learning model predicting the type of the content of the target segment by identifying user operation data corresponding to the target segment, and the fourth machine learning model being obtained by training user operation data corresponding to the sample segments and the types of contents of the sample segments.

In one embodiment, a distance between two adjacent playback controls displayed in the progress bar is not less than a distance threshold.

In one embodiment, the virtual environment is displayed in the livestreaming image, a target virtual character exists in the virtual environment, and the target segment is generated based on a behavior of the target virtual character. The display module 2001 is configured to:

display a playback control of a target segment corresponding to the target virtual character on a periphery of the target virtual character.

In one embodiment, the display module 2001 is configured to:

display a highlighting mark on the target virtual character, the highlighting mark being used for highlighting the target virtual character; and display, in response to a control display operation triggered based on the target virtual character, the playback control of the target segment corresponding to the target virtual character on the periphery of the target virtual character.

In one embodiment, the display module 2001 is configured to:

display, in response to a playback list display operation, a playback list of the target segment in the livestreaming interface; and display the playback control in the playback list.

In one embodiment, the display module 2001 is configured to:

display a prompt bullet screen comment corresponding to the target segment in a livestreaming bullet screen; and display, in response to a split screen display operation triggered by the prompt bullet screen comment, the livestreaming image in a first split screen area and display a playback image of a target segment corresponding to the prompt bullet screen comment in a second split screen area.

In one embodiment, the display module 2001 is configured to:

display, in response to acquiring the target segment, the playback image of the target segment by using a small window at an edge of the livestreaming interface according to a preset duration; and display, in response to a split screen display operation triggered by the playback image, the livestreaming image in the first split screen area and display the playback image of the target segment in the second split screen area.

In one embodiment, an avatar of a virtual character controlled by a player participating in an event is displayed in the livestreaming image. The display module 2001 is configured to:

display, in response to a list display operation triggered by an avatar of the target virtual character, a playback list of the target segment corresponding to the target virtual character, a playback control of the target segment corresponding to the target virtual character being displayed in the playback list, the target segment being generated based on a behavior of the target virtual character; and display, in response to a split screen display operation triggered by the playback control corresponding to the target virtual character, the livestreaming image in the first split screen area and display the playback image of the target segment corresponding to the target virtual character in the second split screen area.

In one embodiment, the display module 2001 is configured to:

display, in response to a detail display operation triggered by the playback control, a detail introduction control corresponding to the target segment in the livestreaming interface, information for introducing the target segment being displayed in the detail introduction control; and display, in response to a split screen display operation triggered by the detail introduction control, the livestreaming image in the first split screen area and display the playback image in the second split screen area.

In one embodiment, the display module 2001 is configured to:

display, in response to that a gesture operation in the livestreaming interface meets a trajectory condition, the livestreaming image in the first split screen area and display the playback image in the second split screen area, the trajectory condition being set for a sliding trajectory of the gesture operation.

In one embodiment, as shown in FIG. 21, the apparatus further includes:

a determining module 2002, configured to determine a display ratio of the second split screen area in the livestreaming interface according to the type of the content of the target segment.

In one embodiment, the display module 2001 is configured to:

display, in response to that the event live stream includes the plurality of target segments and in response to a switching operation for the playback image, the playback image of the target segment of the event live stream in a switch mode according to a time sequence.

The display apparatus for the event livestreaming provided by the embodiments above is only illustrated with an example of division of the above function modules. In practical applications, the above functions may be allocated to and completed by different function modules according to requirements, that is, the internal structure of the apparatus is divided into different function modules, so as to complete all or part of the functions described above. The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. In addition, the display apparatus for the event livestreaming provided in the above embodiment and the embodiments of the display method for the event livestreaming fall within the same conception, and its specific implementation process is detailed in the method embodiment, which will not be repeated here.

An embodiment of the present disclosure further provides a computer device. The computer device includes: a processor and a memory. The memory stores at least one instruction, at least one program, and a code set or an instruction set, and the at least one instruction, the at least one program, and the code set or the instruction set are loaded and executed by the processor to implement the display method for the event livestreaming provided by all the method embodiments above.

In some embodiments, the computer device is a terminal. Exemplarily, FIG. 22 is a schematic structural diagram of a terminal provided by an exemplary embodiment of the present disclosure.

Generally, the terminal 2200 includes: a processor 2201 and a memory 2202.

The processor 2201 may include one or more processing cores, such as a 4-core processor and an 8-core processor. The processor 2201 may be implemented in at least one hardware form of digital signal processing (DSP), a field-programmable gate array (FPGA), and a programmable logic array (PLA). The processor 2201 may also include a main processor and a coprocessor. The main processor is a processor configured to process data in an awake state, and is also referred to as a central processing unit (CPU). The coprocessor is a low-power-consumption processor configured to process data in a standby state. In some embodiments, the processor 2201 may be integrated with a graphics processing unit (GPU). The GPU is configured to render and draw content that needs to be displayed on a display screen. In some embodiments, the processor 2201 may further include an artificial intelligence (AI) processor. The AI processor is configured to process computing operations related to machine learning.

The memory 2202 may include one or more computer-readable storage mediums. The computer-readable storage medium may be non-transient. The memory 2202 may further include a high-speed random access memory and a nonvolatile memory, such as, one or more disk storage devices or flash storage devices. In some embodiments, the non-transient computer-readable storage medium in the memory 2202 is configured to store at least one instruction, and the at least one instruction is configured to be executed by the processor 2201 to implement the display method for the event livestreaming provided in the method embodiments of the present disclosure.

In some embodiments, the terminal 2200 may further include a display screen 2203. The display screen 2203 is configured to display a user interface (UI). The UI may include a graph, text, an icon, a video, and any combination thereof. In response to that the display screen 2203 is a touch display screen, the display screen 2203 further has a capability of collecting a touch signal on or above a surface of the display screen 2203. The touch signal may be inputted into the processor 2201 as a control signal for processing. In this case, the display screen 2203 may be further configured to provide a virtual button and/or a virtual keyboard that are/is also referred to as a soft button and/or a soft keyboard. In some embodiments, there may be one display screen 2203, arranged on a front panel of the terminal 2200. In some other embodiments, there may be at least two display screens 2203, respectively arranged on different surfaces of the terminal 2200 or in a folded design. In some yet other embodiments, the display screen 2203 may be a flexible display screen, arranged on a curved surface or folded surface of the terminal 2200. Even, the display screen 2203 may be further arranged in a non-rectangular irregular pattern, namely, a special-shaped screen. The display screen 2203 may be prepared by using materials such as a liquid crystal display (LCD), and an organic light-emitting diode (OLED).

A person skilled in the art may understand that a structure shown in FIG. 22 constitutes no limitation to the terminal 2200, and the terminal may include more or fewer components than those shown in the figure, or combine some components, or adopt different component arrangements.

An embodiment of the present disclosure further provides a computer-readable storage medium. The computer-readable storage medium stores at least one program code, and the program code, when loaded and executed by a processor of a computer device, implements the display method for the event livestreaming provided by all the method embodiments above.

An embodiment of the present disclosure further provides a computer program product or a computer program, the computer program product or the computer program includes a computer instruction, and the computer instruction is stored in a computer-readable storage medium. A processor of a computer device reads the computer instruction from the computer-readable storage medium, and the processor executes the computer instruction, so that the computer device executes the display method for the event livestreaming provided by all the method embodiments above.

What is claimed is:

1. A display method for event livestreaming, applied to a computer device, and comprising:

displaying a livestreaming image of an event live stream in a livestreaming interface, the event live stream being a stream of an event in which one or more virtual characters play in a virtual environment;

displaying a progress bar in the livestreaming interface;

displaying a playback control of a target form corresponding to a target segment at a target progress location of the progress bar in the livestreaming interface, the target segment being a historical segment in the event live stream, the target progress location indicating a corresponding playback progress of the target segment in the event live stream, the playback control corresponding to a plurality of display forms, the target form being a display form corresponding to a type of content of the target segment among the plurality of display forms of the playback control, the type of content of the target segment including at least one of a first type of content associated with the one or more virtual characters releasing a skill to an enemy virtual character, a second type of content associated with the one or more virtual characters defeating one or more neutral creatures in the virtual environment, or a third type of content associated with the one or more virtual characters destroying an enemy building, the first type of content, the second type of content, and the third type of content corresponding respectively to different display forms of the plurality of display forms;

determining, in response to a split screen display operation triggered based on the playback control, a display ratio of a second split screen area in the livestreaming interface based on a needed display range associated with the type of content of the target segment; and displaying, in response to the split screen display operation triggered based on the playback control, the livestreaming image in a first split screen area and displaying a playback image of the target segment in the second split screen area based on the determined display ratio of the second split screen area, the first split screen area and the second split screen area being different display areas in the livestreaming interface, and the first split screen area and the second split screen area having no intersection.

2. The method according to claim 1, further comprising:

determining the type of the content of the target segment through at least one model of a first machine learning model, a second machine learning model, a third machine learning model, or a fourth machine learning model, wherein the first machine learning model is configured to predict the type of the content of the target segment by identifying the playback image of the target segment, and the first machine learning model being obtained by training playback images of sample segments and types of contents of the sample segments; the second machine learning model is configured to predict the type of the content of the target segment by identifying audio of the target segment, and the second machine learning model being obtained by training audios of the sample segments and the types of contents of the sample segments; the third machine learning model is configured to predict the type of the content of the target segment by identifying commentary audio corresponding to the target segment, and the third machine learning model being obtained by training commentary audios corresponding to the sample segments and the types of contents of the sample segments; and the fourth machine learning model is configured to predict the type of the content of the target segment by identifying user operation data corresponding to the target segment, and the fourth machine learning model being obtained by training user operation data corresponding to the sample segments and the types of contents of the sample segments.

3. The method according to claim 1, wherein a distance between two adjacent playback controls displayed in the progress bar is not less than a distance threshold.

4. The method according to claim 1, wherein the virtual environment is displayed in the livestreaming image, a target virtual character exists in the virtual environment, and the target segment is generated based on a behavior of the target virtual character; and the displaying the playback control corresponding to the target segment in the livestreaming interface comprises:

displaying the playback control of the target segment corresponding to the target virtual character on a periphery of the target virtual character.

5. The method according to claim 4, wherein the displaying the playback control of the target segment corresponding to the target virtual character on the periphery of the target virtual character comprises:

displaying a highlighting mark on the target virtual character; and displaying, in response to a control display operation triggered based on the target virtual character, the playback control of the target segment corresponding to the target virtual character on the periphery of the target virtual character.

6. The method according to claim 1, wherein the displaying the playback control corresponding to the target segment in the livestreaming interface comprises:

displaying, in response to a playback list display operation, a playback list of the target segment in the livestreaming interface; and displaying the playback control in the playback list.

7. The method according to claim 1, wherein a livestreaming bullet screen is displayed on the livestreaming image; and the method further comprises:

displaying a prompt bullet screen comment corresponding to the target segment in the livestreaming bullet screen; and displaying, in response to the split screen display operation triggered by the prompt bullet screen comment, the livestreaming image in the first split screen area and displaying a playback image of a target segment corresponding to the prompt bullet screen comment in the second split screen area.

8. The method according to claim 1, further comprising:

displaying, in response to acquiring the target segment, the playback image of the target segment by using a window at an edge of the livestreaming interface according to a preset duration; and displaying, in response to the split screen display operation triggered by the playback image, the livestreaming image in the first split screen area and displaying the playback image of the target segment in the second split screen area.

9. The method according to claim 1, wherein an avatar of a virtual character controlled by a player participating in the event is displayed in the livestreaming image; and the method further comprises:

displaying, in response to a list display operation triggered by the avatar of the target virtual character, a playback list of one or more candidate segments corresponding to the target virtual character, a playback control of the target segment corresponding to the target virtual character being displayed in the playback list, the one or more candidate segments being generated based on a behavior of the target virtual character; and displaying, in response to the split screen display operation triggered by the playback control corresponding to the target segment of the target virtual character, the livestreaming image in the first split screen area and displaying the playback image of the target segment corresponding to the target virtual character in the second split screen area.

10. The method according to claim 1, wherein the displaying, in response to the split screen display operation triggered based on the playback control, the livestreaming image in the first split screen area and displaying the playback image of the target segment in the second split screen area comprises:

displaying, in response to a detail display operation triggered by the playback control, a detail introduction control corresponding to the target segment in the livestreaming interface, information for introducing the target segment being displayed in the detail introduction control; and displaying, in response to the split screen display operation triggered by the detail introduction control, the livestreaming image in the first split screen area and displaying the playback image in the second split screen area.

11. The method according to claim 1, further comprising:

displaying, in response to that a gesture operation in the livestreaming interface meets a trajectory condition, the livestreaming image in the first split screen area and display the playback image in the second split screen area, the trajectory condition being set for a sliding trajectory of the gesture operation.

12. The method according to claim 1, further comprising:

displaying, in response to that the event live stream comprises the plurality of target segments and in response to a switching operation for the playback image, the playback image of the target segment of the event live stream in a switch mode according to a time sequence.

13. The method according to claim 1, wherein any two different display forms of the plurality of display forms are different in at least one of a shape of the playback control, an icon displayed in the playback control, text displayed in the playback control, or a color of the playback control.

14. A display apparatus for event livestreaming, comprising:

at least one processor and at least one memory, the at least one memory storing at least one instruction, at least one program, and a code set or an instruction set, and the at least one instruction, the at least one program, and the code set or the instruction set being loaded and executed by the at least one processor to implement:

displaying a livestreaming image of an event live stream in a livestreaming interface, the event live stream being a stream of an event in which one or more virtual characters play in a virtual environment;

displaying a progress bar in the livestreaming interface;

displaying a playback control of a target form corresponding to a target segment at a target progress location of the progress bar in the livestreaming interface, the target segment being a historical segment in the event live stream, the target progress location indicating a corresponding playback progress of the target segment in the event live stream, the playback control corresponding to a plurality of display forms, the target form being a display form corresponding to a type of content of the target segment among the plurality of display forms of the playback control, the type of content of the target segment including at least one of a first type of content associated with the one or more virtual characters releasing a skill to an enemy virtual character, a second type of content associated with the one or more virtual characters defeating one or more neutral creatures in the virtual environment, or a third type of content associated with the one or more virtual characters destroying an enemy building, the first type of content, the second type of content, and the third type of content corresponding respectively to different display forms of the plurality of display forms;

determining, in response to a split screen display operation triggered based on the playback control, a display ratio of a second split screen area in the livestreaming interface based on a needed display range associated with the type of content of the target segment; and displaying, in response to the split screen display operation triggered based on the playback control, the livestreaming image in a first split screen area and displaying a playback image of the target segment in the second split screen area based on the determined display ratio of the second split screen area, the first split screen area and the second split screen area being different display areas in the livestreaming interface, and the first split screen area and the second split screen area having no intersection.

15. The apparatus according to claim 14, wherein the displaying the playback control corresponding to the target segment in the livestreaming interface comprises:

displaying, in response to a playback list display operation, a playback list of the target segment in the livestreaming interface; and displaying the playback control in the playback list.

16. A non-transitory computer-readable storage medium, storing at least one instruction, at least one program, and a code set or an instruction set, and the at least one instruction, the at least one program, and the code set or the instruction set being loaded and executed by at least one processor to implement:

displaying a livestreaming image of an event live stream in a livestreaming interface, the event live stream being a stream of an event in which one or more virtual characters play in a virtual environment;

displaying a progress bar in the livestreaming interface;

displaying a playback control of a target form corresponding to a target segment at a target progress location of the progress bar in the livestreaming interface, the target segment being a historical segment in the event live stream, the target progress location indicating a corresponding playback progress of the target segment in the event live stream, the playback control corresponding to a plurality of display forms, the target form being a display form corresponding to a type of content of the target segment among the plurality of display forms of the playback control, the type of content of the target segment including at least one of a first type of content associated with the one or more virtual characters releasing a skill to an enemy virtual character, a second type of content associated with the one or more virtual characters defeating one or more neutral creatures in the virtual environment, or a third type of content associated with the one or more virtual characters destroying an enemy building, the first type of content, the second type of content, and the third type of content corresponding respectively to different display forms of the plurality of display forms;

determining, in response to a split screen display operation triggered based on the playback control, a display ratio of a second split screen area in the livestreaming interface based on a needed display range associated with the type of content of the target segment; and displaying, in response to the split screen display operation triggered based on the playback control, the livestreaming image in a first split screen area and displaying a playback image of the target segment in the second split screen area based on the determined display ratio of the second split screen area, the first split screen area and the second split screen area being different display areas in the livestreaming interface, and the first split screen area and the second split screen area having no intersection.

* * * * *